United States Patent
Mizutani et al.

(10) Patent No.: US 8,089,865 B2
(45) Date of Patent: Jan. 3, 2012

(54) MULTICAST PATH MANAGEMENT AND PROTECTION

(75) Inventors: Masahiko Mizutani, Yokohama (JP);
Atsushi Iwamura, Yokohama (JP);
Yoshihiro Ashi, Yokohama (JP);
Masayuki Takase, Fujisawa (JP);
Hideki Endo, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 690 days.

(21) Appl. No.: 12/223,274

(22) PCT Filed: Aug. 4, 2006

(86) PCT No.: PCT/JP2006/315494
§ 371 (c)(1),
(2), (4) Date: Jul. 25, 2008

(87) PCT Pub. No.: WO2007/086157
PCT Pub. Date: Aug. 2, 2007

(65) Prior Publication Data
US 2010/0226244 A1  Sep. 9, 2010

(30) Foreign Application Priority Data
Jan. 25, 2006 (JP) .................................. 2006-015770

(51) Int. Cl.
*H04J 1/00* (2006.01)
(52) U.S. Cl. .......................... 370/223; 370/227; 370/228
(58) Field of Classification Search .......... 370/216–228, 370/252–253, 254–258; 709/251; 714/1–3, 714/25
See application file for complete search history.

(56) References Cited

U.S. PATENT DOCUMENTS

| 6,353,593 B1 * | 3/2002 | Chen et al. | 370/216 |
| 2003/0063560 A1 * | 4/2003 | Jenq et al. | 370/216 |

FOREIGN PATENT DOCUMENTS

| JP | 2001-320392 A | 5/2000 |
| JP | 2003-229876 A | 2/2002 |

OTHER PUBLICATIONS

"Virtual Bridged Local Area Networks—Amendment 5: Connectivity Fault Management", IEEE 802.1ag/D5.2 Interworking Task Group of IEEE 802.1, Dec. 6, 2005, pp. a-j, pp. i-v, pp. 1-122.
"Generic Protection Switching Ring Protection", ITU-T Draft New Recommendation G. 808.2 (ex. G.gps.2), Version 3, Apr. 2, 2008, pp. 1-21.

(Continued)

*Primary Examiner* — Pao Sinkantarakorn
(74) *Attorney, Agent, or Firm* — Crowell & Moring LLP

(57) ABSTRACT

Provided is a multicast path management method for a connectionless communication. Also provided is a path protection function which is effective when a path has failed. A network is formed by a trunk and a branch path. The multicast path is managed by end-to-end and when a failure has occurred, an instruction is issued from the apex of the multicast tree to respective end-to-end paths so as to switch from the currently used channel to a backup path. Thus, upon failure, an individual path protection can be performed without affecting other parts of the tree to which the same multicast flow as the defective path is distributed or the distribution state of the multicast flow.

10 Claims, 36 Drawing Sheets

OTHER PUBLICATIONS

"OAM Functions and Mechanism for Ethernet based network", ITU-T Recommendation Y.1731, Series Y: Global Information Infrastructure, Internet Protocol Aspects and Next-Generation Networks, Internet Protocol aspects—Operation, Administration and Maintenance, Feb. 2008, pp. 1-78.

"Ethernet Protection Switching", ITU-T Recommendation G. 8031/Y.1342, Series G: Transmission Systems and Media, Digital Systems and Networks, Ethernet Over Transport Aspects—General Aspects, Series Y: Global Information Infrastructure, Internet Protocol Aspects and Next-Generation Networks, Internet Protocol Aspects—Transport, Jun. 2006, pp. 1-42.

IEEE Std 802.17™ 2004, IEEE Standard for Information Technology—Telecommunications and Information Exchange Between Systems—Local and Metropolitan Area Networks—Specific Requirements, "Part 17: Resilient Packet Ring (RPR) Access Method and Physical Layer Specifications", Sep. 24, 2004, pp. 1-664.

"Gigabit-capable Passive Optical Networks (GPON): General Characteristics", ITU-T Recommendation G. 984.1, Series G: Transmission Systems and Media, Digital Systems and Networks, Digital Sections and Digital Line System—Optical Line Systems for Local and Access Networks, Mar. 2003, pp. 1-15.

International Search Report for PCT/JP2006/315494, dated Sep. 19, 2006.

* cited by examiner

FIG. 24

| MULTICAST GROUP ADDRESS (1501) | STATION (CP) IDENTIFIER (1502) | valid (1503) | COMMUNI-CATION PATH (1504) | (1505) |
|---|---|---|---|---|
| MCDA #1 | S1 | 1 | 1 | |
| | S2 | 1 | 0 | |
| | ------- | | | |
| | SN | 0 | 0 | |

| MCDA #m | S1 | 1 | 1 | |
|---|---|---|---|---|
| | S2 | 1 | 0 | |
| | ------- | | | |
| | SN | 0 | 0 | |

(1430)

MULTICAST PATH MANAGEMENT AND PROTECTION

This application claims priority from Japanese Patent Application JP 2006-015770 filed on Jan. 29, 2006, the content of which is hereby incorporated by reference into this application.

TECHNICAL FIELD

The present invention relates to a multicast path protection method and in particular, to a path management method and a path switching method for a network of a format in which data is copied for a branch path deriving from a trunk path for transmission.

BACKGROUND ART

For protection of a communication path, it is necessary to set a backup channel for a currently used path. Conventionally, only the path switching by point-to-point has been taken into consideration because of the simplicity of the path setting and the switching condition. In the conventional technique such as SDH and ATM, a static network is basically set by an operator and accordingly, a point-to-point communication using a fixed logical path or a fixed physical path has been mainly used in the communication. However, the connectionless network such as the Ethernet (Ethernet is a trade mark of Fuji Xerox Co., Ltd.) which is mainly used in the network of the current and the next generation is characterized by an automated control such as MAC address learning by STP (Spanning Tree Protocol), the line automatic recognition function of the Ethernet, and a routing protocol in the IP network. These are user-friendly but an operator cannot easily know the path. Furthermore, in a network based on a packet communication, a new concept of multicast and broadcast, i.e., one-to-plurality communication is supported, which also makes the path management difficult together with the introduction of the automatic setting function.

In the NGN (Next Generation Network) configuration, a network system building based on a packet communication is recommended. Moreover, the thigh-speed technique of the Ethernet is being standardized and the application field is increasing from LAN to WAN and a carrier network. Accordingly, the quality of the connectionless communication has become an important object. The multicast function of the connectionless communication such as the Ethernet is and will be an indispensable function when integrating the communication services from now on.

However, the multicast flow communication path changes all the time, depending on the user multicast group participation state or the like. Moreover, even when a multicast path is statistically set, the multicast paths are partially overlapped with one another on the network and it is difficult to know the path to be managed.

On the other hand, the Ethernet is applied to a metro network. The metro region contains a network distributed to a user side, i.e., an individual installation network such as a carrier access network (regional network) and an enterprise site. A ring network provides a mutual connectivity of separate regional networks and connects a user network to a core side (WAN side) providing a wider connection, there by realizing a wide-range communication (enabling use of the Internet).

Assume the form of the broadcast service as a mass medium such as the current television broadcast. It is possible to assume a form that a data stream is distributed to a user from a broadcast station distribution device installed at the WAN side. Here, in the hierarchical network configuration successively containing the regional networks in the WAN side wide-region network, the regional network is connected to the WAN side wide-region network via the ring network. Moreover, as another example, when information is shared by a plurality of region networks or individual sites, the number of cases of using the multicast function is increasing. If the cases require a certain level of quality and confidentiality, it is indispensable to manage the multicast path.

The network using the ring can be classified into the path in which the multicast paths constitute the ring and an individual path which is branched from the ring and proceeds toward a user. In order to avoid the problem of the aforementioned overlap in the individual path, it is possible to assume one of the multicast path protection models as a combination of the ring protection and the linear protection, thereby realizing path management.

Non-Patent Document 1: IEEE P802.1 ag/D5.2, "Virtual Bridged Local Area Networks Amendment 5: Connectivity Fault Management"

Non-Patent Document 2: ITU-T Recommendation G.808.2, "Generic Protection Switching Ring"

Non-Protection Document 3: ITU-T Recommendation T. 1731, "OAM Function and Mechanisms for Ethernet based network"

Non-Patent Document 4: ITU-T Recommendation G. 8031 "Ethernet Protection Switching"

Non-Patent Document 5: IEEE 802.17, "Resilient packet ring (RPR) access method and physical layer specifications"

Non-Patent Document 6: ITU-T Recommendation G. 984.1, "Gigabit-capable Passive Optical Networks (GRON General Characteristics"

DISCLOSURE OF INVENTION

Problem to be Solved by the Invention

In order to maintain the end-to-end path while performing a countermeasure against a communication failure, protection concerning a ring trunk should be linked with protection concerning a branch portion. Up to now, discussed are linear protection for point-to-point path between two points (Non-Patent Document 1) and protection in a ring network (Non-Patent Document 2). However, in order realize the end-to-end path management, it is necessary to manage the enabled/disabled state by the end-to-end crossing a plurality (both) of paths. For this, in addition to the communication state management function at the both ends of the conventional path, it is necessary to provide a failure information handling technique at a path connection point (in this case, nodes (also called stations) constituting a ring and serving as points connecting the ring and trunk).

Suggested is a method using a multicast address from the viewpoint of compatibility with an existing product and a high performance of the OAM frame process in designing the Ethernet OAM (Operation, Administration and Management) function defined in the Non-Patent Document 3. The multicast address is used to identify a path and also as an ID for identifying the "function" of OAM. In either case, in the data link layer of the OSI model, the multicast address is broadcast in the VLAN (Virtual LAN). Accordingly, it is necessary to perform such a design that the OAM or the user frame will not flow into an unnecessary path in the path management. Thus, the multicast path management via a ring requires the path connection function in a node (station) and the multicast frame filter technique.

It is therefore an object of the present invention to provide a method for realizing a multicast path management in the connectionless communication whose end-to-end management has been difficult conventionally. Another object of the present invention is to provide a path protection function effective for a part or whole of a multicast path by minimizing the affect to other part of a tree distributing the same multicast by performing a minimum process when a failure has occurred in the path.

Means for Solving the Problem

It is therefore an object of the present invention to realize a protection function which performs management of a multicast path by end-to-end in a network formed by a trunk and a branch path and performs switching from a currently used channel to a backup channel for respective end-to-end paths when a failure has occurred. For this, at the multicast flow transmission source node existing on the trunk, management is performed on the end-to-end communication state for the path logically set to the respective destinations of the multicast flow. An individual path is protected without affecting a communication state of other multicast path partially shared for the same multicast flow distribution by instructing switching from the point when necessary such as upon a failure.

Advantages of the Invention

The present invention enables an important quality management in a network operation management and service management by managing the multicast path communication state in a multicast flow transmission source (hereinafter, referred to as a route station) on a ring so as to know the end-to-end path information. Moreover, it is possible to realize the path switching with a minimum process, which reduces the process time required for the path switching and reduces the process of the control/management frame, thereby improving the network resource use efficiency. Furthermore, it is possible to eliminate the need of switching function at the connection point between the trunk and branch path. That is, no state transmission is required in the device and the transmission side need not consider the affect of the switching process.

EMBODIMENT 1

In the first embodiment of the present invention, an explanation will be given on a method for instructing a path switching by a minimum process according to the path information known in a multicast flow transmission source (hereinafter, referred to as a route station) on the ring. This method can reduce the process time required for path switching and reduce the network resource use ratio.

FIG. 1 is a block diagram showing a network configuration which employs the present invention and a multicast distribution method using the network. This configuration uses a ring network for connecting a WAN side network 10000 with user side networks NXW, NXP (X=1 to 4). The ring network is formed by nodes S0 to S5 (hereinafter, referred to as stations S0 to S5). Hereinafter, a communication path formed by the stations S0 to S5 and the ring network connecting them will be referred to as a trunk. Moreover, paths connecting the respective stations S1 to S5 with user terminals 131 to 136 by the respective networks NXW, NXP (X=1 to 4) will be referred to as branched lines. The user side networks NXW, NXP (X=1 to 4) may be, for example, a network of an enterprise site, a local network of a carrier, or a home network of a user. Moreover, the connection format may be the LAN for mutual connection via a router and a switch for entering an individual site network from a ring or a connection via the PON (Passive Optical Network) which is now actively used in a collective housing and an enterprise building.

The multicast data distribution reaches a user terminal from the multicast server 20000 via the WAN side network 10000, the ring-shaped trunk, and a branched line. Here, in order to assure a path from the station S0 to the user terminals 131-136, the data transfer path has a redundant configuration. In the normal state, data is transferred along a path shown by a solid line in the figure, i.e., the path (forward-direction path) 110 from the station S0 and passing through S1 and S2 in this order. The data which has passed along the ring returns to the station S0 and is terminated. The station S0 has a start point 1000 and an end point 2000 of the multicast path. For a backup channel, a combination of a start point 2000 and an end point 1000 is used. The start point 1000 and the end point 2000 may have independent function blocks for each of the currently used channel and the backup channel.

In each of the stations S1 to S4, if a user requesting for the multicast (belonging to the multicast group) exists in the network NXW, NXP (X=1 to 4) under the stations S1 to S4, the multicast data received on the ring is copied and transferred to a branched line. If a failure occurs in the forward-direction path 110 on the ring and the forward-direction communication 111 is interrupted, the ring switches a part or whole of the trunk path to the backup channel so as to assure the communication between the stations. For example, FIG. 1 shows a communication example when all the paths are switched. That is, the data from the multicast server 20000 is transferred from the station S0 to a backup channel path 120, passes through S5, S4, and S3 in this order to go round the ring, and is terminated in the station S0. The data flow in this direction is called a reverse-direction communication. This data flow is indicated by a dotted line in the figure. Like the forward-direction communication, in the case of the reverse-direction communication also, the respective stations S4 to S1 transfer data to the ring, copy the data frame, and transfer it to the branched line if the multicast reception terminal exists at the destination of the networks NXW, NXP (X=1 to 4) under the stations.

In the ring network, the communication direction of the normal ring is determined in advance. The present invention provides a method for the end-to-end protection containing a branched line. For example, Non-Patent Document 5 discloses RPR as a protection control method concerning the trunk portion of the ring. Moreover, instead of switching the entire communication direction upon a failure, it is possible to make a return connection of the forward-direction communication and the reverse-direction communication at stations sandwiching a failure point so as to avoid the failure point, thereby building a round path along the ring while avoiding the failure point. The present invention can exhibit its effect even when either of these methods is employed. Hereinafter, the explanation on the embodiment assumes that upon occurrence of a failure, the method of switching the communication direction of the entire ring trunk is employed.

NXW and NXP (X=1 to 4) are the currently used channel and the backup channel network in the branched lines. The currently used channel and the backup channel network in the branched lines are set to provide a linear protection mechanism in a communication path having stations SX (X=0 to 4) and edge nodes (ENX (X=1 to 4) constituting the ring as end points. In the example of N1W and N1P, a frame is transferred via N1W as the currently used channel in the normal state. The data flow in this case is indicated by a solid line connecting the station S1 and the edge node EN1. If a failure has occurred on the path of N1W such as a case when communication is disabled in the bath between the station S0 and the node 101, a path passing through the N1P is selected as a path from the station S0 to the edge node EN1 so as to assure the multicast path to the user terminals 131, 132. The backup channel flow is indicated by a dotted line.

It should be noted that the currently used path N1W and the backup channel path-N1P are shown as independent networks from each other. However, these may exist in a single network for the packet-based communication. That is, it is also considered that a path which is used as a currently used channel for a certain flow may be a backup channel for another flow. In the explanation below, in order to clarify the explanation, like in FIG. 1, the networks of the currently used channel and the backup channel are shown separately from each other. This is a conceptual (logical) description for distinguishing the roles of the paths.

Moreover, Non-Patent Document 3 and Non-Patent Document 4 define methods such as 1+1, 1:1, 1:N as network forms which employ the linear protection. The present invention does not limit the method for implementing the linear protection to a particular one. Hereinafter, firstly, in the branched line, the explanation will be given on a case of the 1:1 protection. For variations when using other methods, explanation will be given after the explanation of the embodiment using the 1:1 protection.

In FIG. 1, protection of the ring trunk and protection of the branched line are independent from each other. Stations S1 to S5 have the function to mutually connecting the trunk and the branched line. This function is shown in the figure by CPX (X=1 to 5). Moreover, the edge nodes EN 1 to 4 as end points of the multicast path have termination function EP1 to EP4 for terminating the flow transmitted from the currently used channel path or the backup channel path. Moreover, the station S0 as a multicast start on the ring has the multicast path end point function CP0.

In FIG. 1, the station S0 serves as the multicast start. However, the present invention may also be applied to a multicast between two or more networks. That is, when data is transmitted from a user terminal 131 to user terminals 135, 136 by the multicast, the end point of the multicast path transmission side is the station S1. Moreover, the other end points are EN3 and EN4. In this example, the path from the station S1 directly to the station S2 is the currently used channel and the path passing through S0 is the backup channel.

FIG. 2 explains the OAM frame control method in the embodiment of FIG. 1. Here, explanation will be given on the case using the CC (Continuity Check) frame transmission method disclosed in Non-Patent Document 3 as the method for managing the network connection state.

The CC frame is a frame for checking a unidirectional communication state. Here, the communication state is checked for the multicast path. A total of four paths are set between the station S0 as the multicast path transmission side end point and the individual user side end points because of the difference between the currently used channel and the backup channel and the difference between the currently used channel and the backup channel in the branched line. Accordingly, in order to effectively apply the protection, it is necessary to know the communication states of the four paths.

The CC frame traces a data path (multicast path) and accordingly, uses a multicast path identical to a data path. Here, a path identifier in inserted into a header of the CC frame so as to identify respective paths via the individual end points EN1 to EN4. The path identifier inserted into the header indicates whether the currently used channel or the backup channel is used for communication in the branched line. The station S0 transmits a total of four frames: CC frames transmitted to the currently used path which are distributed to a currently used channel branched line and a backup channel branched line; and CC frames transmitted to a backup path from the S0 station and distributed to a currently used branch path and a backup channel.

Here, explanation will be given on a path identification method in the case of N2W and N2P. This method also applies to other user networks NXW, NXP (X=1 to 4). In the figure, A represents a path passing through a ring trunk and a branched line both of the currently used channel; B represents a path passing through the ring trunk of the currently used channel and a branched line of the backup channel; C represents a path passing through a ring trunk of the backup channel and a branched line of the currently used channel; and D represents a path passing through the ring trunk and the branched line both of the backup channel. The CC frames 201 to 204 respectively contain path identifiers 211 to 214. These identifiers may define new protocol fields. However, here explanation will be given on a case using an existing header field. That is, four types of VLAN tags or MPLS labels are set for each multicast address and each reception edge node EN in a protocol field used for path control in a protocol field containing a VLAN tag or MPLS label. The four types are respectively correlated to A to D. Thus, stations S1 to S4 can realize distribution to the currently used channel and to the backup channel by setting a VLAN (logical port) for each line interface or preparing an MPLS forwarding table. When the VLAN tag is used, A to D respectively represents different VLAN identifiers. Since the transfer path differs depending on the multicast address, it is possible to use the IGMP/MLD snooping or a manually set filter to decide whether a branching transfer is required in each of the stations S1 to S4.

FIG. 3 shows a CC frame transmission method for checking connectivity for the reverse-direction communication of the same path as in FIG. 2. Each of the edge nodes EN1 to EN4 transmits a CC frame to station S0.

Each of the edge nodes EN1 to EN4 transmits a CC frame to a currently used channel branched path and a backup channel branched path. For example, N1W transmits a CC frame to node 101 and N1P transmits a CC frame to node 102. The logical path identification method used here may be, for example, VLAN or MPLS. It is also possible to employ recommendations of the OAM and linear protection method. The present invention may be applied by using any of them.

Upon reception of the CC frame from the edge nodes EN1 to EN4, each of the stations S1 to S4 places the CC frame on the currently used channel or the backup channel of the ring trunk for transmission to station S0. Here, in the ring trunk, one of the usable paths may be used. Station S0 terminates the CC frame and checks the path state from the edge node EN to the station S0 according to information contained in the CC frame and an OAM management parameter including the CC frame reception interval.

Here, the destination address used for the CC frame is a unicast address. That is, the identifier of the station S0 is used. This is because, for example, if a CC frame transmitted EN1 is spread to a branching path in other station, CPU resources of the link band and the relay node are excessively consumed.

It should be noted that it is also considered to use the backup channel of the ring for CC frame transfer on the ring trunk to the station S0. In the linear protection, a CC frame is normally transmitted to trance the same path in the reverse direction. However, when the number of multicast branches is small, it is possible to reduce the resource consumption for the ring trunk and increase the path management efficiency by using the backup channel for the ring trunk.

The CC frame transmission process shown in FIG. 2 and FIG. 3 is as follows. Firstly, the station S0 transmits a CC frame destined to a multicast address. The frame contains an address owned by the station S0 as a transmission source address. Upon reception of the CC frame, the edge node of the reception side can know the destination of the CC frame transmitted in the upstream direction. The upstream CC frame is transmitted to the address of the station S0 obtained from the downstream CC frame by using the address of the edge node itself as the transmission source address.

FIG. 4 shows a block diagram showing a configuration of the multicast frame when the present invention is applied.

Here, explanation will be given on a frame configuration based on the Ethernet format. Into the frame destination address 301 is inserted an address indicating the multicast group address to be distributed. Moreover, into the transmission source address 302 is inserted an address of an output interface of the node as the multicast frame transmission source in the broadcast domain. Into the Ether type field 303 is inserted a type value which defines whether it is an OAM frame or a user data frame and which identifies the most significant protocol. The frame sandwiches one or more VLAN tags and includes other header information 305 and a payload 306.

In this embodiment, an explanation will be given on a case using a VLAN tag for identifying the multicast path. The VLAN tag is formed by a COS value 310, a CFI 320, and a VLAN ID 330. A part of the VLAN tag is used as an identifier for identifying the multicast path. Here, the VLAN ID is divided into a flow identifier 331 and a path identifier 332. The path identifier is formed by n bits from 332-1 to 332-n.

Each of the path identifier bits is defined to use the currently used channel if 0, and the backup channel if 1. The position of X of 332-x (X=1 to n), i.e., the bit positions are correlated to the respective node (station) identifiers constituting the ring.

Consequently, for each of flows decided by the multicast flow identifier 331, the number of VLAN IDs prepared is twice as many as the number of stations respectively constituting the ring. According to the branch line failure state, each bit of the path identifier is rewritten to transmit a multicast flow, thereby controlling the multicast path from the station S0.

The VLAN tag space for the path control may be decided in the same level as the other services. Alternatively, it is also possible to separately decide tags to be used for the path from the ring to the edge node of the present invention, stack the tags at the station S0, i.e., when a multicast flow is inserted into the path management section in the present invention, and delete them at the edge node.

FIG. 5 to FIG. 7 explain a failure information report method used when a network of FIG. 1 has failed.

FIG. 5 shows an operation for reporting a failure in a branch line to the station S0. Here, explanation will be given on a process performed in a case when a failure has occurred in the user side network N3W. There is given an example of failure detection when both of the ring trunk and the branch line use the currently used channel. An ME (Maintenance Entity) for managing an inter-node connection is set between the station S3, relay nodes 105, 106, and the edge node EN3. Moreover, an ME for managing an end-to-end path is set between the station S0 and the edge node EN3. The CC frame explained with reference to FIG. 2 and FIG. 3 is an OAM frame used for managing the ME.

As shown in FIG. 2, the CC frames inserted at the station S0 are respectively connected to the currently used branch lines at CP1 to CP4 when passing through the currently used ring trunk and are respectively connected to the currently used branch lines at CP1 to CP4 and reach the path end points EP1 to EP4 at the EN1 to EN4. Here, assume that in the N3W, a failure has occurred between the relay nodes 105 and 106 and the CC frame cannot reach the En3. The relay node 106 detects a communication failure of the CC frame and issues IS (Alarm Indication Signal). The AIS is further reported from the relay node 106 to the edge node EN3 and the edge node recognizes the failure on the communication path.

FIG. 6 shows a method for reporting failure information from the edge node EN3 which has detected a failure to the multicast path transmission side end point (ME end point, i.e., station S0).

The backup channel path is used for communication from the edge node EN3 to the station S3. Here, an RDI (Remote Defect Indication) issued from the EN3 is reported. The RDI message is transmitted as a unicast frame destined to the identification address of the station S0. The station S3 references the destination address of the RDI message and transfers the message via the CP3 to the ring trunk, so that the RDI message reaches the station S0. Thus, the multicast path transmission end point can recognize a failure on the distribution system path.

It should be noted that the path used for transferring the RDI message to the ring trunk depends on the ring trunk control method as has been described above. Here, it is assumed to use an active path on the ring trunk. However, it is also to perform the report by using the backup channel path. The degree of freedom of the path selection does not affect the feature of the present invention.

FIG. 7 shows a multicast path transmission method after reception of the failure information in FIG. 6. As shown in the frame format of FIG. 4, the bit to be referenced by the station S3 is rewritten in the VLAN tag or the MPLS label (here, explanation is given by assuming that the VLAG tag is used). The bit is used for referencing the currently used channel and the backup channel of the branch line upon frame transfer. The bit set as shown in by N3W in the normal state is modified to the one shown by N3P. Here, the one to be rewritten is the bit used by the station S3 for referencing. Since the bit position to be referenced for identifying the currently used channel and the backup channel of the transfer destination branch line in each station is separately prepared, the instruction for the station S3 will not affect a branch line from other station.

At the station S0, a part of the frame header information is modified so as to easily realize path modification. At the stations S1 to S4 as the relay points, a table containing transfer destination paths for the respective VLAN tags is prepared. Sine no addition of a particular function or setting is required, it is possible to rapidly perform switching upon occurrence of a failure and it is possible to realize multicast path management at low cost. Thus, this method is very practical.

FIG. 8 shows an ME setting method at a branch line. Here, the ME setting method will be explained in the example of N3W and N3P.

In FIG. 8, the end point 510a of the 510ME set at the station S0 and the end point 510b set at the edge node EN3 are the points called MPE (Maintenance Entity End Point). The ME is arranged between the MEPs. The 510ME is an ME for managing the communication path of the currently used channel. Moreover, 570ME is set between the station S0 and the edge node EN3 for simultaneously managing the backup channel. The 570ME has end points MEP570a and 570b. The backup channel path passes through the relay node 107 and is different from the currently used channel. So they are depicted separately from each other.

The CC frame is transferred in the downstream direction and the upstream direction along these ME and the path management is performed. FIG. 8 shows a method for reporting an OAM message when a failure is detected in the currently used channel ME. That is, when an SS frame 560 from the station S0 cannot be communicated because of the failure which has occurred between the relay nodes 105 and 106, the edge node EN3 which was to receive the CC frame transmits an RDI message reporting a failure to the station S0. The RDI frame is reported in the inverse direction along the 510ME of the currently used channel.

There is a case that it is impossible to use the currently used channel path for transmitting RDI from the edge node EN3 to the station S0 because of a physical failure such as a line disconnection. In such a case, it is possible to use an APS message used in the linear protection. The APS message is transmitted from the end point of the management section via the backup channel path to the opposing end point of the management section. Here, in the station S0, the VLAN ID is modified and used as a trigger for switching the multicast transmission path.

FIG. 9 shows an example of a failure detection operation when the MEs are hierarchically set unlike FIG. 8. More specifically, the example of FIG. 9 uses a trigger reaching the RDI transmission which is different from that of FIG. 8.

When the MEs are hierarchically set like in FIG. 9, the ME of an upper level manages a wide range. In each of the set ME hierarchies, a CC frame is transmitted for managing the set section. When a CC frame of a lower level has detected a failure, the failure information is passed to an ME of an upper level in the node and the ME of the upper level reports it to the other node on the ME.

Here, assume that a physical failure has occurred. A CC frame 590 cannot reach the relay node 106 because of the communication failure between the relay nodes 105 and 106. The relay node 106 detects a failure in the 532ME and reports it as an AIS signal in the node to 520ME as an upper level ME. The failure information is reported to the edge node EN3 along 520ME. At the final end point EN3, the failure information is reported to the 510ME as the upper level ME. By this failure information, an RDI message is transmitted to the edge nodes EN3 and the station S0. The APS frame transmission is also triggered in the same way. The APS transmission path is identical to that of FIG. 8.

FIG. 10 shows a sequence explaining flows of the processes explained in FIG. 5 to FIG. 7 in the case of FIG. 8. The station S0 periodically transmits a CC frame to the branch line of the currently used channel and that of the backup channel (601). Here, no consideration is taken on the ring trunk protection and attention is paid only on the branch line path identification by depicting flows of the two systems. The station S3 connecting the trunk to the branch line references a frame header path bit and decides whether to transfer to the currently used channel or the backup channel of the branch line path (602). When the edge node detects a failure (603), it reports the failure to the station S0 by using the currently used channel path and transmits an RDI message (604). Moreover, an APS message requesting for a path switching is transmitted to the opposing ME end point (i.e., station S0 as the multicast transmission side end point) according to the linear protection switching process by using a usable path (the backup channel in this case). The station S0 references the reception information. Upon detection of a multicast path failure, the station S0 switches the branch line path of the corresponding station and after to the backup channel and accordingly, the path identification bit of the VID assigned to the multicast frame is modified (606).

FIG. 11 shows a sequence explaining flows of processes explained in FIG. 5 to FIG. 7. The station S0 periodically transmits a CC frame to the branch line of the currently used channel and that of the backup channel (651). Here, since the ring trunk protection is not taken into consideration and attention is paid only on the branch line route identification, flows of the two systems are depicted. When the node 106 constituting the branch line detects a failure (652), it transmits the CC frame reception failure detected in the local device toward the end point of the ME to which the CC frame is to be transmitted. Here, the AIS message is used (653). When the edge node EN3 receives the AIS message (654), the edge node EN3 transmits the RDI message so as to report the failure to the station S0 using the currently used channel path (604). Moreover, according to the linear protection switching process, by using a usable path (the backup channel in this case), an APS message requesting for the path switching is transmitted to the opposing ME end point (i.e., station S0 as the multicast transmission side end point) (605). When the station S0 references the reception information and detects the multicast path route failure, the station S0 switches the branch line path of the corresponding station and after to the backup channel. Accordingly, the path identification bit of the VID to be assigned for the multicast frame is modified (606).

Next, explanation will be given on a process performed when a failure has occurred in a branch line of the multicast path. FIG. 12 shows a failure report method used upon detection of a failure in a communication from the edge node to the station S3 (called reverse direction or upstream direction) by a CC frame periodically transmitted in the path shown in FIG. 3.

The edge node EN3 periodically transmits a CC frame. The CC frame is a unicast frame directed to the station S0. Each of the nodes constituting the path from the edge node EN3 to the station S0 receives a CC frame if they are nodes supporting the OAM function, judges whether the frame contains correct management information in the path or whether the frame is transmitted at a correct time interface so as to process the CC frame along the flow of the OAM frame control, and transfers the frame to a destination address.

Hereinafter, explanation will be given on two examples of processes performed when a failure has occurred in an intermediate path (here, a branch line).

Firstly, like in FIG. 8, when only the end-to-end ME is set on the path, the station S0 can directly know a path failure when an expected CC frame is not received.

Next, like in FIG. 9, when ME is set hierarchically, the node on the path issues an AIS signal upon detection of a path failure, i.e., if an expected CC frame is not received. The AIS signal is transmitted as an AIS message to an end point side (downstream side of the ME) as compared to the device which has detected the failure and the ME end point, i.e., the station S0 detects the path failure.

When the failure is detected in each of the cases and if the failure is one-directional failure, the currently used channel can be continuously used for the forward-direction path for transferring the multicast flow. However, if the failure is a line failure, communication of both directions may be simultaneously disabled. In this case, when any one of the failures shown in FIG. 5 to FIG. 7 and FIG. 12 is detected, there is a possibility that the path should be switched. Here, the station S0 which has received the AIS message modifies the content of the VLAN tag to be assigned to the multicast frame so that the branch line having the failure is switched to the backup channel. After the currently used channel network N3W is switched to the backup channel N3P, the multicast distribution path is identical to that of FIG. 7.

FIG. 13 explains a failure detection operation performed when only the end-to-end ME is set in the explanation of FIG. 12. The station S0 detects a path failure as a trouble if a CC frame having an expected OAM parameter is not received or a CC frame is not received at an expected cycle.

FIG. 14 explains a process performed upon detection of a failure shown in FIG. 12 when ME is hierarchically set like in FIG. 9.

At each ME level, CC frames 801, 802, and 803 are periodically transmitted. Here, if a line fails between the relay nodes 106 and 105, the CC frame 803 which has been transmitted to the MEP532b cannot reach the opposing MEP532a and the MEP532a detects a failure. Then, the MEP532a reports an AIS signal 811 to the upper level ME. The failure information is reported along the 520ME to the MEP531a. Similarly, the MEP51a reports an AIS signal to the upper ME level and the upper ME level reports the AIS information to the station S0. When the configuration including only one ME on the ring like in the present embodiment, the device which reports the AIS information to the station S0 is the station S3.

FIG. 15 shows a sequence for performing a failure information report process when ME is set like in FIG. 13. The edge node EN3 periodically transmits a CC frame for each of the branch line of the currently used channel and that of the backup channel (901). Here, CC setting is performed like in FIG. 1. That is, no consideration is taken on the ring trunk protection and the end-to-end path is set across the ring trunk and the branch line. When the CC frame contains an unexpected OAM parameter, or when CC frame reception interval is not a set value, the station S0 detects a failure and modifies the path to other usable path toward the edge node EN3 (rewrites the VLAN ID) (903).

FIG. 16 shows a sequence of a failure detection operation performed when CC setting is performed like in FIG. 14. Here, explanation is given on the operation performed until the failure information in the ME532ME as the lowermost level ME reaches the station S0. Since the upper level ME covers a wider range than the lower level ME, a failure in the lower level ME directly affects the upper level ME. Consequently, the protection process should be performed in the lowermost ME which has detected a failure.

The relay node 105 periodically transmits a CC frame along the management section 532ME (901). When the node 106 constituting the branch line detects a failure, transmits the CC frame reception failure detected in the local device toward the end point S3 of the ME to which the CC frame is to be transmitted. Here, the AIS message is used. The AIS frame is transferred to S0. Upon reception of the AIS message, the station S0 performs path switching. More specifically, when the station S0 detects a path failure by referencing the AIS message, the station S0 modifies the path identification bit of VID assigned to the multicast frame so as to switch the branch line path of the station and after to the backup channel.

FIG. 17 shows a process performed when the ring trunk path has failed. The present invention assumes that the ring trunk portion has a protection function. For the ring protection, it is possible to use the RPR disclosed in the Non-Patent Document 5 or the linear protection method disclosed in Non-Patent Document 4. Any of the trunk portion protection functions may be used. In this embodiment, explanation will be given on the two methods for assuring the end-to-end path.

One of the methods is as follows. The station S0 uses the RPR control management protocol and issues an instruction to switch the entire ring path to the backup channel. The RPR has a control management protocol which manages a link between adjacent stations and manages the entire ring topology information. When a failure has occurred in a link between nodes, the failure information is successively reported to the adjacent nodes and the ring path is changed to the backup channel. The station S0 transmits a CC frame and a multicast frame to the backup channel which has become active. Here, the VLAN ID to be assigned to the frame is switched to the VLAN ID indicating a multicast path using the ring backup channel. It should be noted that when an autonomous management is applied to the connection between adjacent nodes like the RPR, there is no need of reporting the failure information to the station S0 like in the path 1002 of FIG. 17. S3 can directly detects the link failure and starts the path switching between the adjacent nodes.

The other method is as follows. ME is set for the multicast path transmission side end point and the reception side end point. Moreover, the ME is set for the ring trunk transmission side end point and the termination side end point. In this case, the station S0 receives the failure information in two ways like in FIG. 12. That is, the station S0 confirms arrival of the CC frame transmitted by itself and manages the path state by it. Alternatively, CC is hierarchically built along the ring trunk and the relay station issues an AIS message so as to detect a path failure to the station S0. In the former case, no message other than the CC message is passed. FIG. 17 shows a message process in the latter case. In the latter case, upon reception of the failure information AIS via the path 1002 of FIG. 17, the transmission VLAN ID to be assigned to the multicast flow is immediately changed to pass the backup channel of the ring trunk.

FIG. 18 shows a multicast flow communication path after the switching when the second switching method is employed in the explanation of the trunk switching of FIG. 17.

FIG. 19, FIG. 20, FIG. 21, FIG. 22 show a sequence explaining processes from the failure information report until the path switching when the second switching method explained in FIG. 17 is employed. In particular, the setting the end-to-end ME 1210ME is important for the station S0 to know the multicast path state in this embodiment. However, the other portions, i.e., the method for detecting a path failure to detect a failure in the ring trunk in the hierarchical ME setting explained in FIG. 20, FIG. 21 may be replaced by the protocol of the Non-Patent Document 4.

FIG. 19 explains a failure detection operation when only the end-to-end ME1210ME is set between the ring trunk start point (station S0 in the embodiment) to the ring trunk termination point (also station S0) in the explanation of FIG. 17. The station S0 detects a path failure as a trouble when a CC frame having an expected OAM parameter transmitted from the ring start point by itself cannot be received or the CC frame cannot be received at the expected cycle.

FIG. 20 explains a process for hierarchically setting ME for the ring trunk and detecting a failure in the ring trunk.

In each ME level, CC frames 1201 are 1202 are periodically transmitted. Here, if a line failure has occurred between the stations S2 and S3, the CC frame 1202 transmitted from the MEP1223b cannot reach the opposing MEP1223a and the MEP1223a detects a failure. Then, the MEP1223a reports an AIS signal 1211 to the upper ME level and the failure information is reported to the MEP1210a along the 1210ME.

FIG. 21 explains a sequence of a failure information report process in the case of failure detection in FIG. 19. The station S0 periodically transmits a CC frame to the branch line of the currently used channel and that of the backup channel (1301). The station constituting the ring transfers the CC frame to the ring end point. The station S0 receives the CC frame which has been transmitted along the multicast path by itself and checks the OAM parameter contained in the CC frame so as to know the ring communication state. When the CC frame cannot be received correctly, the station S0 detects a ring failure (1302) and changes the multicast frame transmission path (1303).

FIG. 22 explains detection of a ring trunk failure according to the path management method of FIG. 20. A CC frame is periodically transmitted along the ME arranged between the stations. Here, the CC frame is the ME 1223ME between the station S2 and the station S3 transmits a CC frame 1202 (1311). If the MEP opposing to the ME cannot receive the expected CC frame correctly, the MEP detects a failure (1312) and transmits an AIS frame 1212 reporting a CC frame reception failure detected in MEP toward an end point of the ME to which the CC frame is to be transmitted. When the station S0 receives the AIS message (1314), it performs path switching (1303). More specifically, when the AIS information is referenced and a multicast path route failure is detected, the path identification bit of the VID assigned to the multicast frame is modified to switch the branch paths of the corresponding station and after to the backup channel.

Subsequently, explanation will be given on the node required in the present embodiment. The nodes ENX (X=1 to 4) of the multicast path reception side may be the conventional nodes supporting the OAM function. Moreover, the stations constituting the ring requires mutual connection points CPX (X=1 to 5). However, in the present embodiment, the CP function references the header information (the VLAN tag or the MPLS label) transmitted from the station S0 so as to distribute the paths. In order to identify the transfer destination, the L2 frame, L3 frame used in the existing nodes, or the path table of the OSI layer which realizes the packet transfer, or the header conversion table should be set. For the node starting from the multicast requires a partially new function for the multicast path state management and the multicast flow transmission path control.

FIG. 23 is a function block diagram showing a configuration example of the station constituting a ring and serving as a start point and an end point of the multicast path.

The station S0 is formed by a device control unit 1400, a switch unit 1420, and I/O control unit 1410-x (X=1 to N, hereinafter, referred to as 1410). The device control unit 1400 includes a processor 1401, a memory 1402, and an I/O control unit 1430. The processor 1401 is used to execute a program stored in the memory 1402. The process includes execution of a device setting upon start, a path table creation and update, a frame generation when transmitting a frame from a memory, analysis of the frame requiring a firmware process, and a device setting and control according to the frame information. The memory 1402 includes a program for controlling the device, a path table 1431 for managing the frame transfer destination (network topology), a multicast path control table 1430 for controlling and managing the multicast path in the present embodiment, an OAM information database 1440 for holding the OAM parameter setting state in each interface of the station S0, CCDB (CC database) 1441 which learns and holds the OAM topology on the network learned from the OAM frame, and a frame generation unit 1442 which generates an OAM frame for reporting failure information to inside the node and other nodes on the network upon occurrence of a failure.

The I/O control unit 1403 performs handling of device control information between the device control unit 1400 and the switch unit 1420, i.e., access control of the processor 1401 and the memory 1402, control information communication between the processor 1401 and the switch 1420, a frame transmission process from the memory to the switch, and report of the frame information stored in the memory from the switch 1420 to the CPU.

The I/O process unit 1410 includes: a physical interface PHY511 which terminates a communication line; a reception control unit 1412 which converges reception frames, performs header analysis and header conversion, references CCDB1450 stored in the memory 1415 if necessary, and transfers it to the switch unit 1413 or the memory 1415; a switch unit 1413 which transfers the reception frame to the memory 1415 or the upper level switch 1420 according to the header information; a processor 1414 which executes various control programs in the I/O process unit 1410 and controls the switch unit 1413; and a transmission control unit 1416 which performs transmission control by queuing and a header process such as an internal header process and header information write/delete.

FIG. 24 shows a configuration example of the multicast path control table stored in the memory of FIG. 23. This table is referenced when deciding the VLAN tag of the multicast frame shown in FIG. 4. The table contains: a multicast address 1501 indicating the transfer object flow, an identifier 1502 indicating each of the ring-shaped stations, a transfer enable flag 1503 indicating whether to transfer the multicast flow in each station to the downstream side, a transfer path flag 1504 indicating whether to use the currently used channel or the backup channel upon transfer from each station to the downstream side, and other path identifier 1505. When the transfer path flag is 0, the currently system is used, and when the flag is 1, the backup channel is used, for example. The transfer path flag 1504 is stored in the frame tag (label) field of FIG. 4 and used for path control in each station. The other path identifier 1505 is used, for example, for specifying a detailed communication path such as when different paths are used for a user frame and an OAM frame when transmitting a frame to the same multicast path. For this, the information stored in this field includes, for example, Ether TYPE, the OAM type, and priority of the frame process.

In this embodiment, the multicast path management may be performed by the multicast flow transmission source and know the end-to-end communication state in the network from the station S0 to the user. Since the station S0 itself is the ME start point and the end point, a countermeasure for a failure can be immediately taken if the normal OAM management function is provided even if the failure source is a ring trunk or a branch line. That is, this is the node for the easiest node setting.

EMBODIMENT 2

Next, explanation will be given on a second embodiment of the present invention. In the first embodiment which sets the ME between the station S0 and each of the edge nodes ENX (X=1 to 4), an OAM frame such as a CC frame is transmitted to both of paths of the currently used channel and the backup channel. Accordingly, when there are a plenty of stations, it may be difficult to assure a band. On the other hand, the station S0 should perform management of the multicast path for the end-to-end path management. For this, the second embodiment shows a method for path management by the station S0 by setting the ME is set only on the branch line and sharing the OAM information.

The multicast frame transfer route toward a user is identical to that of FIG. 1.

FIG. 25 and FIG. 26 show the ME setting and the CC frame transmission method on the branch line, respectively. The ME is set only on the branch line and the CC frame is periodically transmitted for management of the currently used channel and the backup channel from each station to the edge node (FIG. 25). The reverse direction also uses the CC frame for the path management of each of the currently used channel and the backup channel (FIG. 26). The OAM for the branch line may be based on Non-Patent Documents 3 and 4.

The process performed when a failure has occurred in the branch line is identical to the operation explained in FIGS. 5-7, FIG. 12. Hereinafter, explanation will be given on the ME setting method and the operation sequence for realizing the operation.

FIG. 27 shows a failure information processing method when a single-hierarchy ME is set on the branch line. The CC frame is transferred in the edge node EN3 direction in the set ME section. When a failure is detected, the failure information does not remain in the ME section but the failure information is reported to the station S0 as a path management device other than the ME, which is different from the Non-Patent Document 4 and the first embodiment. More specifically, the feature of the embodiment is that the transfer section of the OAM frames 1761, 1762 exceed the ME.

Fundamentally, the OAM frame is terminated in the ME section. When the OAM is transferred outside like in this embodiment, it is necessary to define that the transfer itself will not be an OAM failure object as an abnormal phenomenon. For transfer in a section where the OAM function is not obtained, it is possible to use encapsulation of the frame. More specifically, it is possible to set a VLAN tag which is valid only within a ring so that the tag is used for report of the OAM frame to the station S0, thereby realizing the present embodiment.

Moreover, it is necessary to correctly process in the device, the OAM information reported to the station S0. For this, the OAM information database of S0 should hold the OAM parameter and the operation state on the ME set on the branch line.

FIG. 28 shows a failure information processing method in which the ME is set between respective nodes in the branch line so that the ME hierarchically exist. The detection of the failure information is identical to that of FIG. 5b. Moreover, the transfer of the detected failure information is identical to that of FIG. 27.

FIG. 29 shows a failure information processing sequence in the case of FIG. 27. The generation and transmission source of a CC frame is station S3 serving as a start point of the branch line (1801). The in-system processing sequence performed after reception of the failure information is different from FIG. 10 in that encapsulating processes 1802 and 1803 are included for passing through the ring trunk when reporting the failure information from the station S3 to the station S0.

FIG. 30 shows a sequence when setting of FIG. 28 is performed. The sequence is identical to that of FIG. 11 except for the encapsulating processes 1802, 1803 for passing through the ring trunk when reporting the failure information from station S3 to station S0.

FIG. 31 and FIG. 32 show the path management method (ME setting method) and the failure information processing method in the inverse-direction communication path of the branch line like in FIG. 7.

FIG. 31 shows a processing method when a single-hierarchy ME is set. Station S3 as the ME end point detect whether a failure has occurred according to the arrival state of the CC frame (2001). When a failure has occurred, a normal linear protection performs path switching at the ME end point. However, in this embodiment, station S0 has the switching function and it reports a switching trigger to the station S0 outside of the ME by using the AIS message 1901.

FIG. 32 is different from FIG. 14 in that the end-to-end ME 510ME is not required. For this, the failure information detected in the branch line is temporarily terminated in station S3. After this, the AIS frame 1914 is transmitted as a switching trigger to station S0 outside of the ME like in FIG. 31.

FIG. 33 is the failure information processing sequence in the case of FIG. 31. The generation and transmission source of the CC frame is the edge node EN3. The in-system processing sequence performed after reception of the failure information is different from FIG. 15 in that the sequence includes: the failure detection 2001; and the generation and encapsulation process 2002 of an AIS frame for passing through the ring trunk when reporting the failure information to station S0.

FIG. 34 shows a sequence when setting of FIG. 32 is performed. The sequence is identical to that of FIG. 16 except for that the sequence includes: the failure detection 2004; and the encapsulation process 2005 for transferring an AIS frame from the relay node 105 since it passes through the ring trunk when reporting the failure information to station S0.

In the second embodiment, station S0 recognizes the path state like in the first embodiment. However, in the first embodiment, the number of stations is large and accordingly, there is a possibility that a plenty of CC frames flow out on the ring. For this, by limiting the section using a CC frame to the branch line, it is possible to improve the ring trunk band use efficiency for the user sub-frames and it is possible to easily link with other protocol for protecting the ring trunk.

It should be noted that in the explanation of the present invention, the station S0 as the multicast transmission point on the ring is made to be a start point (end point) of the multicast path and consideration is taken on protection of the path from S0 to the user side path end point NX (X=1 to 4). However, the path end point at the multicast transmission side may be outside the station S0. That is, by establishing a multicast path using a data relay node in a network 10000 or a multicast distribution server as an end point, it is possible to realize the end-to-end protection function for the multicast path. In this case, the relay node or the multicast server 20000 has the OAM information management function and the protection control function in the station S0.

Moreover, when multicast is performed between user networks, the end point of the transmission side of the multicast path is EN1 or the station S0. Moreover, the end points of the other side are EN3 and EN4, respectively. In this example the currently used channel and the backup channel on the ring are respectively defined as the side from the station S1 to S2 and the side toward S0.

Furthermore, since it is assumed that the communication state on the flow is monitored when separate communication paths exist, the CC frame contains the same multicast address as the data flow. On the other hand, there is a method for monitoring a particular region all the time. In this case, the similar process can be used by transmitting the CC frame having the multicast address received by the EN so as to trace the entire path from the path start point on the ring to the path end point of the user side for the entire system containing the ring trunk and the branch line.

When the multicast between the user networks is taken into consideration, the number of multicast paths to be managed may become extremely large. For this, there arises a necessity to separate a case using the multicast address as the user data from the case using the multicast address fixedly allocated in accordance with the multicast path setting state and the ring configuration size. The former is preferably used when the transmission path is fixed to a certain degree like in broadcast while the latter is preferably used when there are a plenty of multicasts transmitted for each of the users.

The multicast frame path control may also be realized by using IP information. The aforementioned embodiment assumes a process in the data link layer and the multicast frame is broadcast in the VLAN. For this, in order to prevent spread of the multicast packet into an unnecessary path, it is necessary to use the IGMP/MLD snooping or a new multicast frame transfer path control mechanism. When a node can process an IP packet, it is possible to specify a data flow and an OAM frame path by using a multicast path control table which is set statically by an operator or dynamically set by operation of a protocol.

EMBODIMENT 3

In the case of 1+1 protection, data is transmitted simultaneously to the branch line of the currently used channel and that of the backup channel and the reception side edge node selects which of the data is to be employed. Accordingly, the selector setting in the edge node is modified upon transmission of the AIS frame from the edge node for failure information on the branch line which has been detected in a downstream CC frame. For the upstream direction, a CC frame is transmitted from the edge node to both of the currently used channel and the backup channel. For the communication failure in this case, the selector setting is modified for each of ME set between the branch line and the edge node in the station S0 in the first embodiment. Moreover, in the second embodiment, since the ME is terminated in each station, the setting of the selector provided in the station is modified.

FIG. 35 shows a general configuration of a network to which the present invention may be applied. The multicast path is divided into a trunk and a branch line. In the trunk portion, a currently used channel and a backup channel are set. Moreover, in the branch line, a currently used channel and a backup channel are set. They are connected as follows. A mutual connection point CP is set on one node so that communication can be performed from both of the currently used channel and the backup channel of the trunk system respectively to the currently used channel and the backup channel of the branch line. As for the logical path, the currently used channel and the backup channel may exist independently from each other. What is important is that the logical paths are converged and the relay node or the station has the function to correlate their identifiers.

The present system may also be applied to a case using an access line for the branch line of the multicast path. The access system may be, for example, the G-PON (Gigabit-capable Passive Optical Network) disclosed in Non-Patent Document 6. As is disclosed in the Non-Patent Document 6, the G-PON system includes: an ONU (Optical Network Unit) arranged at a user side; an OLT (Optical Line Terminal) terminating a subscriber line; and an optical fiber cable connecting them. As redundant configuration examples for eliminating a failure in the subscriber line, there are [1] a method using a single connection interface for the OLT and the splitter while a dual optical cable is used between them; [2] a method using a plurality of connection ends for both of the PON interface of the OLT and the connection end of the splitter and connecting them by an optical fiber; [3] a method using a plurality of interfaces for the ONU side also and connecting the OLT with the splitter and the splitter with ONU respectively with a plurality of optical fibers so as to assure a redundant channel; and [4] a bottle neck eliminating method which prepares a plurality of splitters in addition to [3] and makes a connection between the splitters by a plurality of channels (Non-Patent Document 6).

FIG. 36 shows a network configuration when the present invention is applied to an access line. Here, explanation will be given on the aforementioned case [3]. In other cases also, the same control can be performed by setting a currently used channel and a backup channel, i.e., two channels in total. What differs by the redundant configuration is the failure resistance.

In stead of N1W to N4W and N1P to N1W, it is possible to set currently used channels W1 to W4 and backup channels P1 to P4 from the connection points CP1 to CP4 of the stations S1 to S4. Each of the PON sections is formed by an optical fiber connected by splitters 3601 to 3604. The fiber path section from the OLT to the ONU via the splitter is made dual. Thus, for each of the paths from the connection points CP1 to CP4 to the edge (end) points EP1 to EP4, it is possible to perform path control in the host device by using the OAM in the same way as the embodiments up to FIG. 35.

INDUSTRIAL APPLICABILITY

The present invention may be applied to management and switching of a data transfer path (or path/flow) when transmitting data via a ring network and a node connected to the ring.

It should be noted that the present invention can also be applied as a path protection function for communication a unicast flow in addition to the multicast flow. (In the case of the ring form, it is necessary to select a combination of Working/Protection even if consideration is taken on a data path of unicast at the connection point between a ring and a branch. This is the different point from the conventional P2P protection.)

The description has been given on the specific embodiments. However, as is clear for those skilled in the art, the present invention is not to be limited to the embodiments but can be modified and corrected in various ways within the range claimed by the attached claims without departing from the sprit of the present invention.

BRIEF DESCRIPTION OF THE DRAWINGS

FIG. 24 shows a configuration example of a multicast path control table stored in a memory of FIG. 23.

FIG. 28 is set.

FIG. 32 is set.

Figure 1:
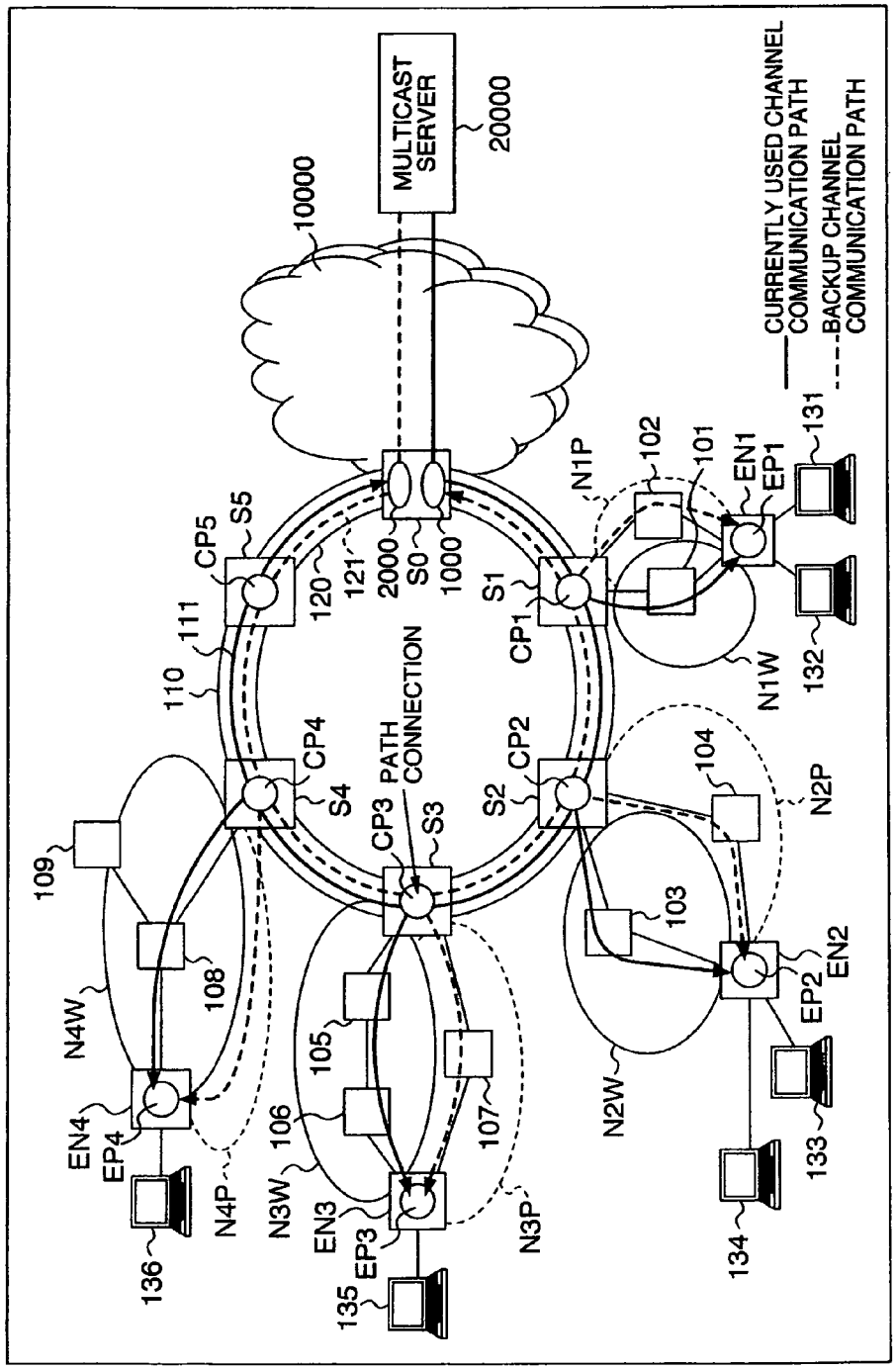
FIG. 1 explains a network configuration based on the present invention and a multicast distribution method using the network.
Figure 2:
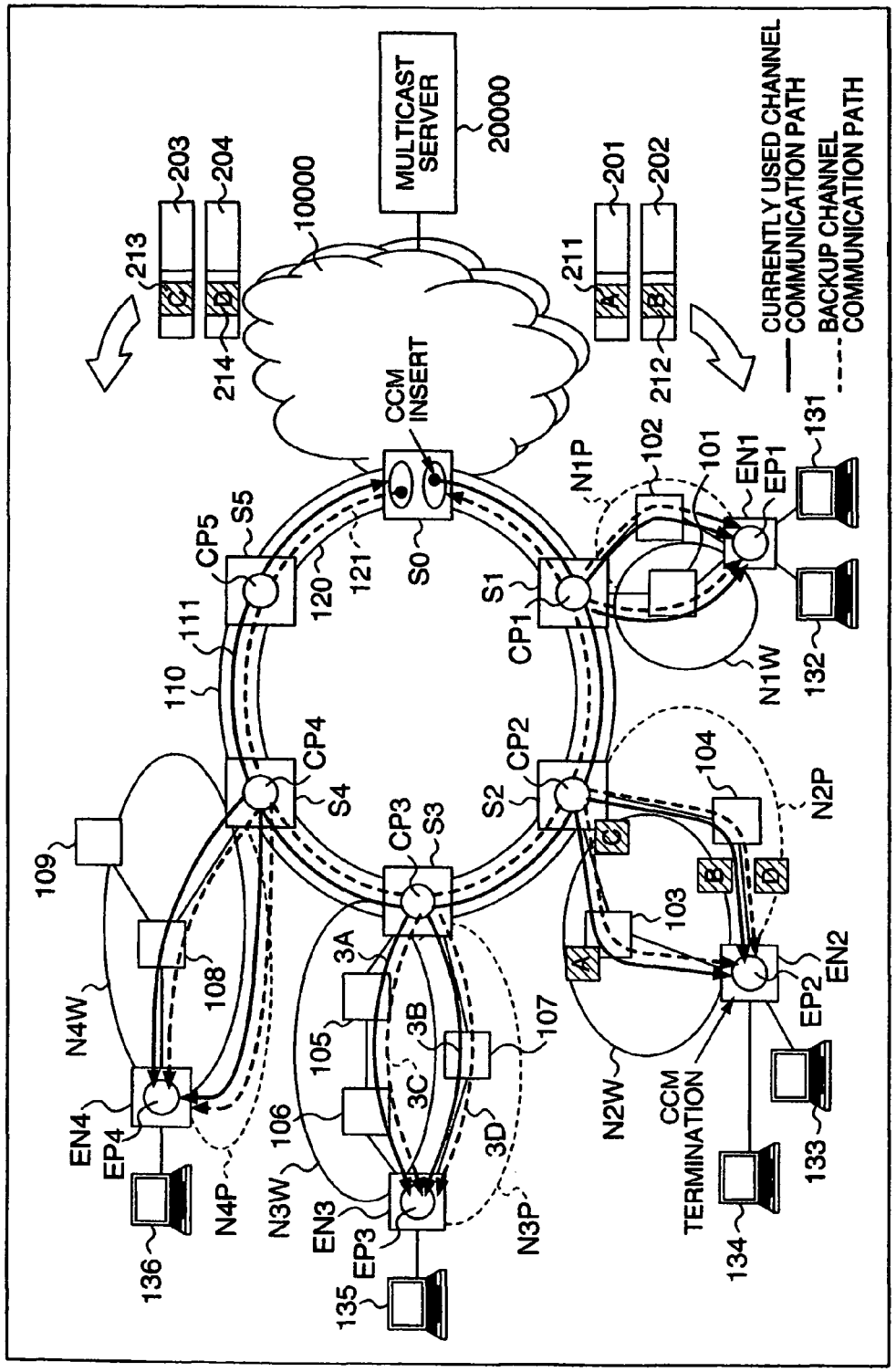
FIG. 2 explains an OAM frame control method in a first embodiment.
Figure 3:
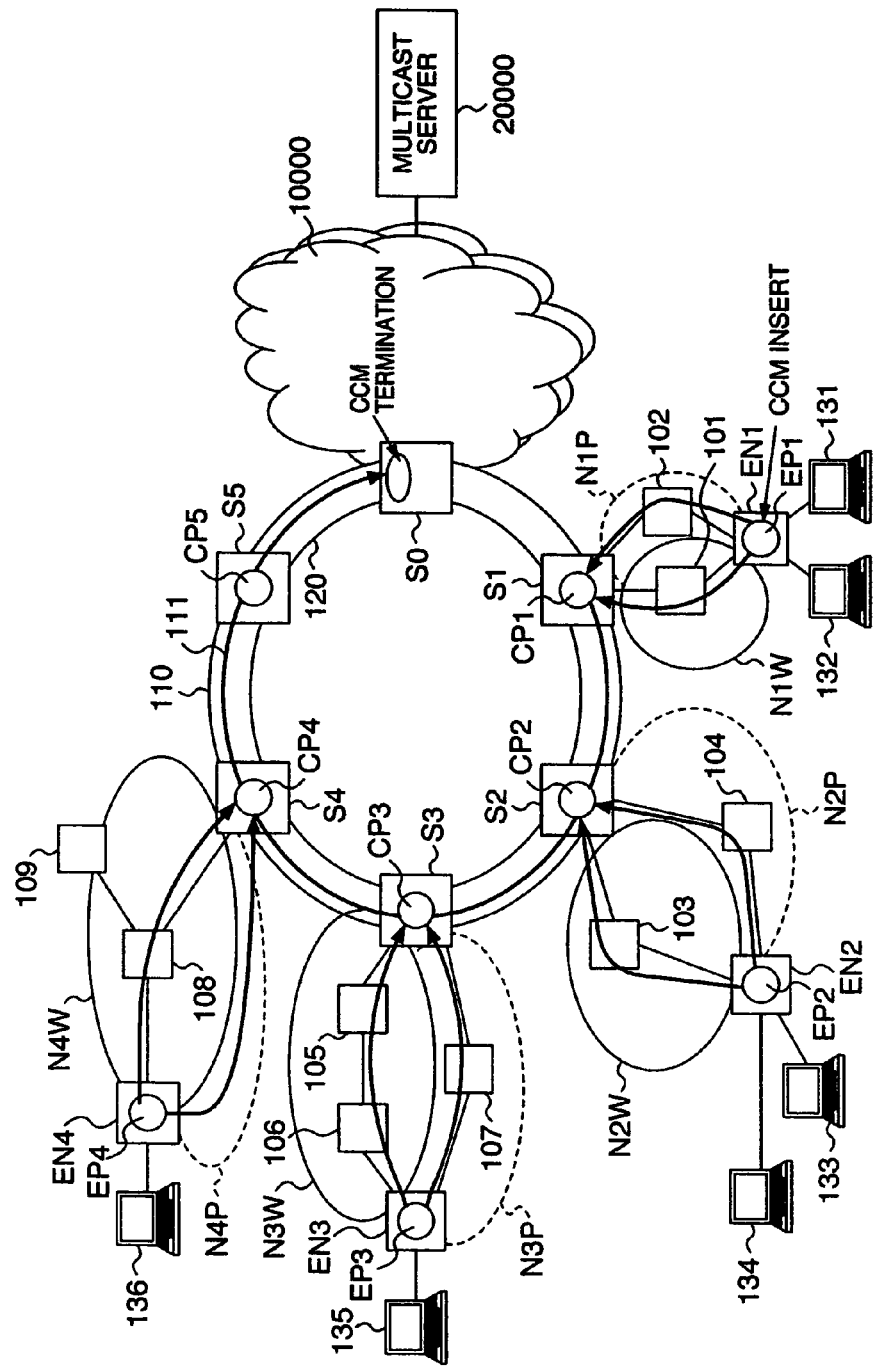
FIG. 3 shows a CC frame transmission method for checking connectivity for the reverse-direction communication of the same path as in FIG. 2.
Figure 4:
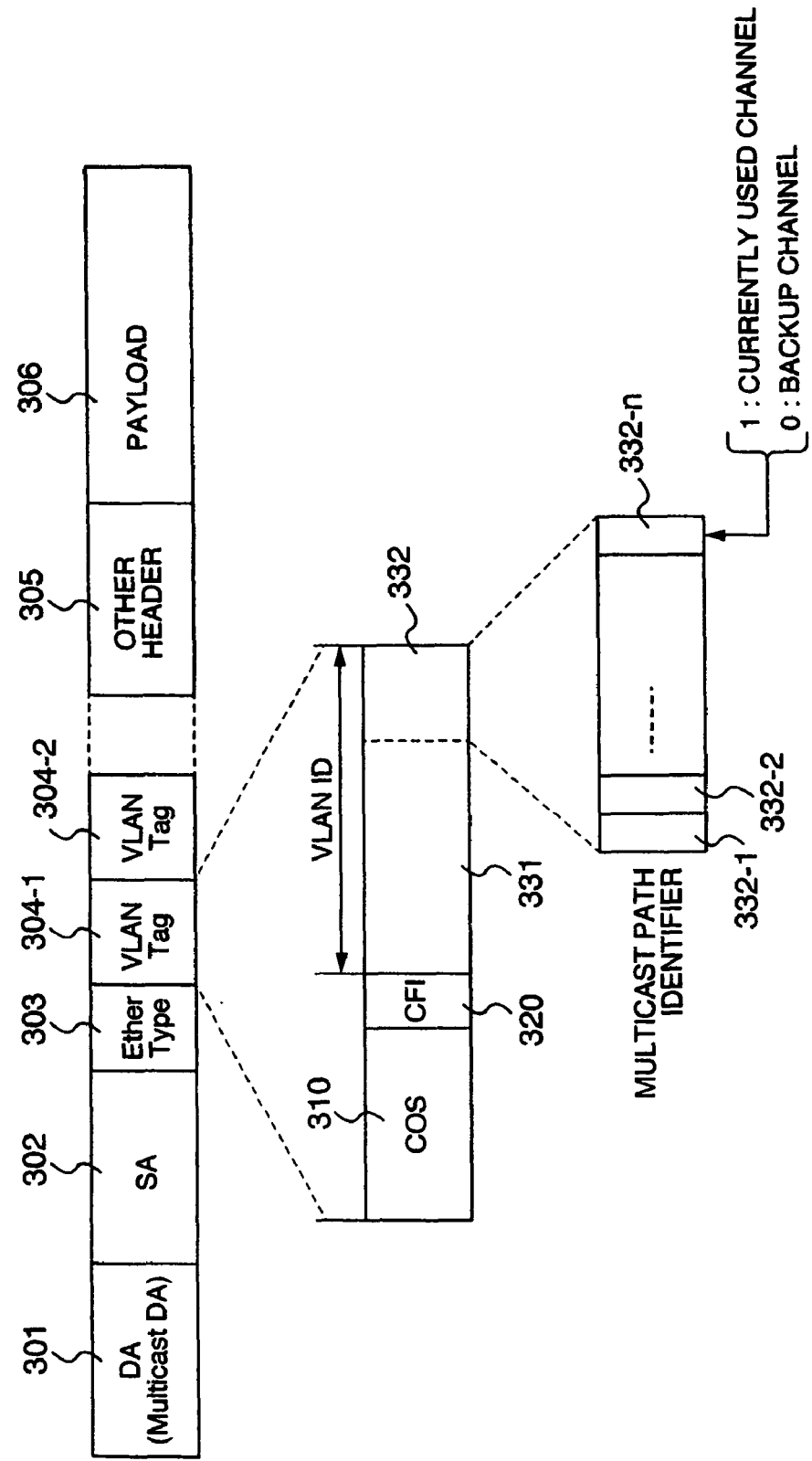
FIG. 4 shows a configuration of the multicast frame when using the present invention.
Figure 5:
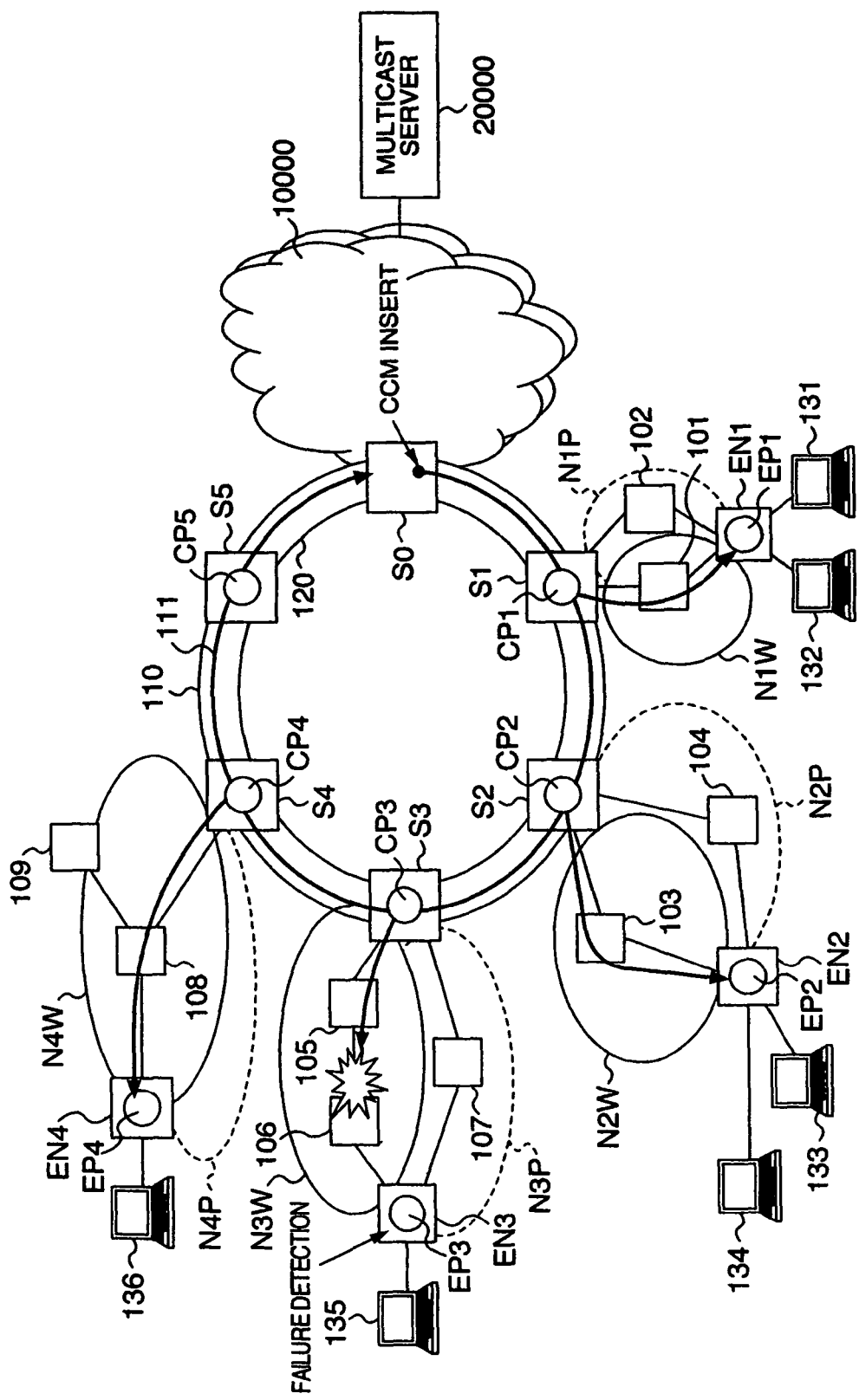
FIG. 5 explains a failure information report method when a failure has occurred in the network of FIG. 1 and shows the operation performed until the failure at a branched line is reported to a station S0.
Figure 6:
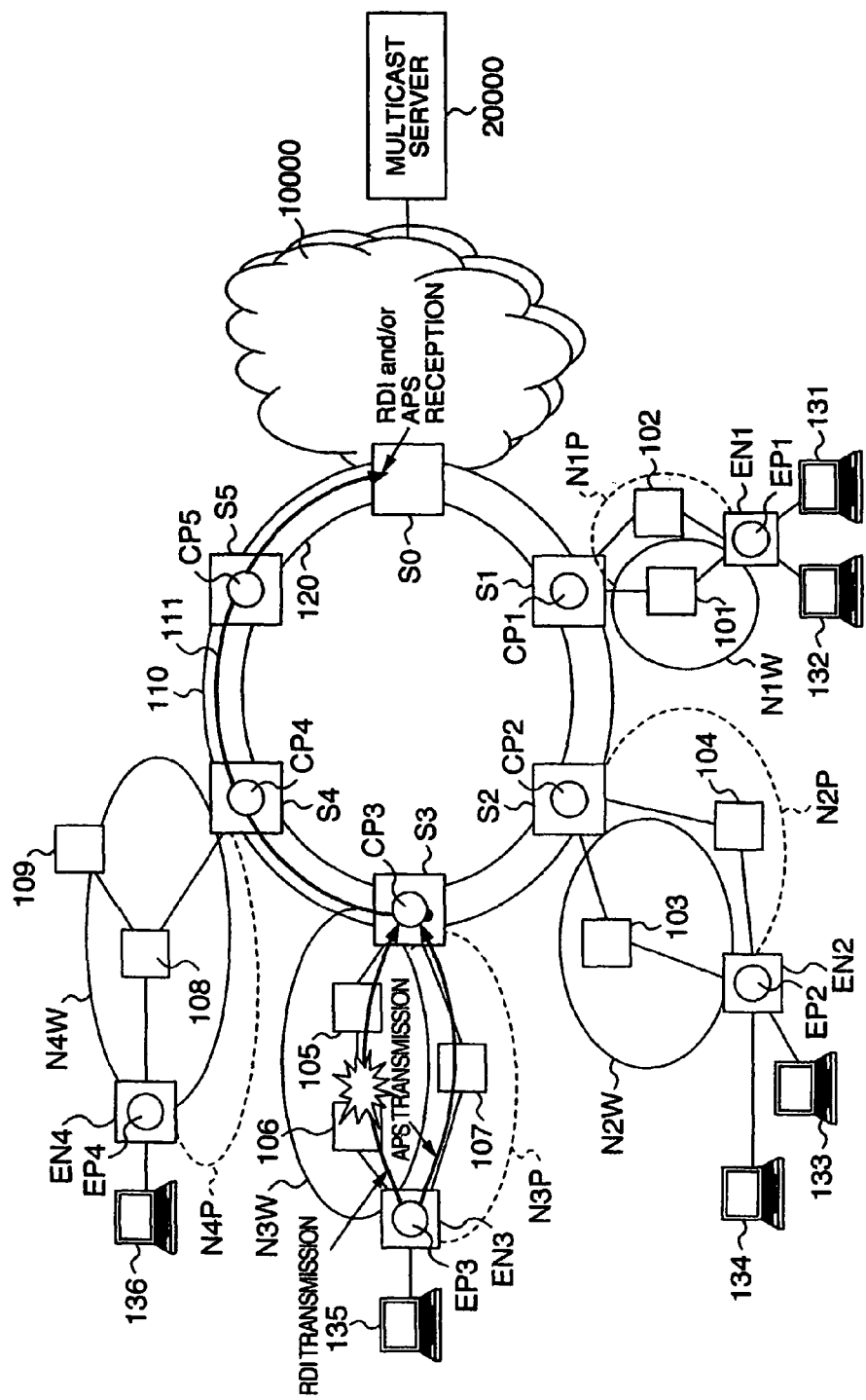
FIG. 6 shows a failure information report method for reporting from an edge node EN3 which has detected a failure to a multicast path transmission side end point (ME end point, i.e., station S0).
Figure 7:
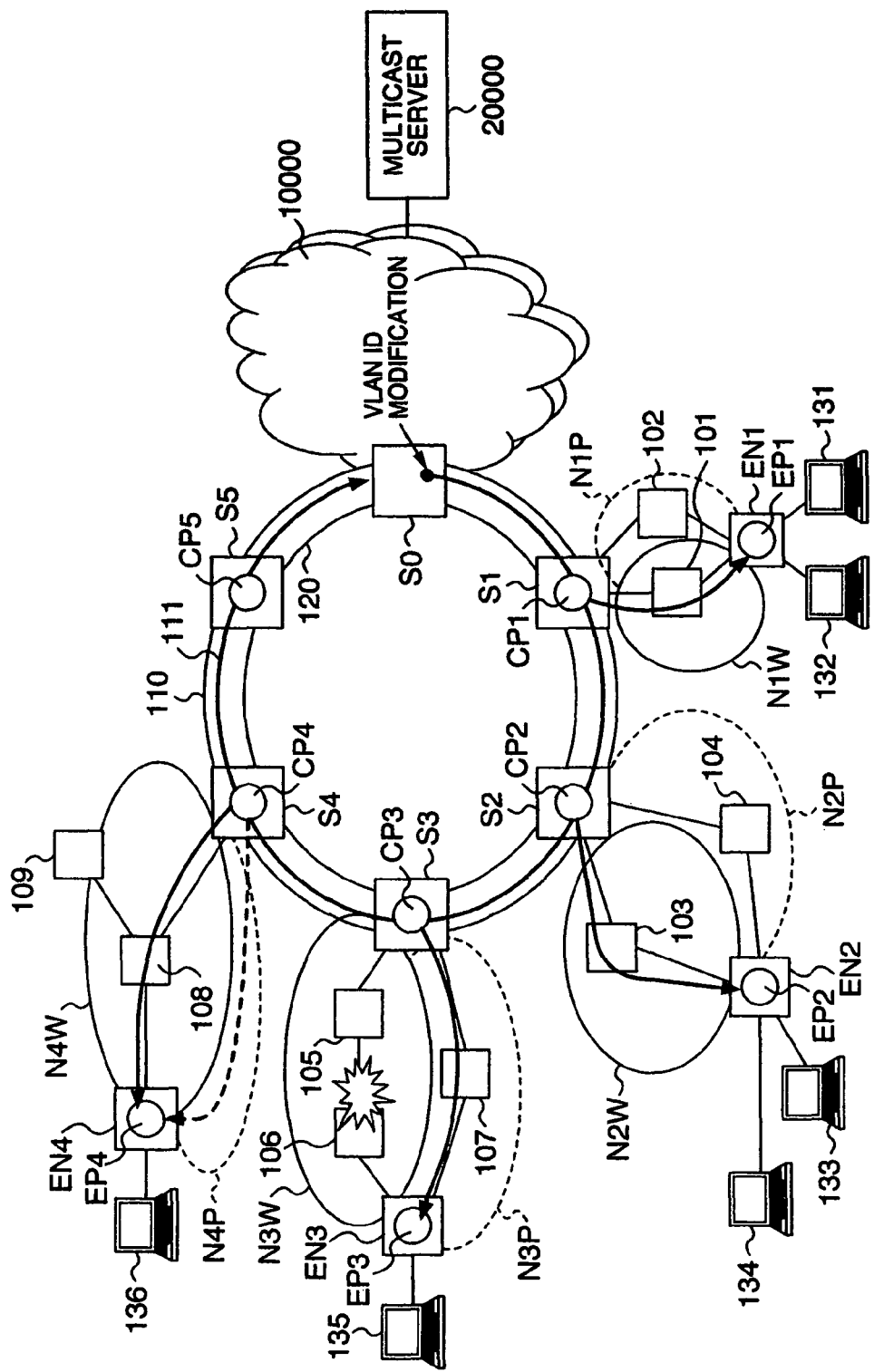
FIG. 7 shows a multicast path transmission path after reception of the failure information in FIG. 6.
Figure 8:
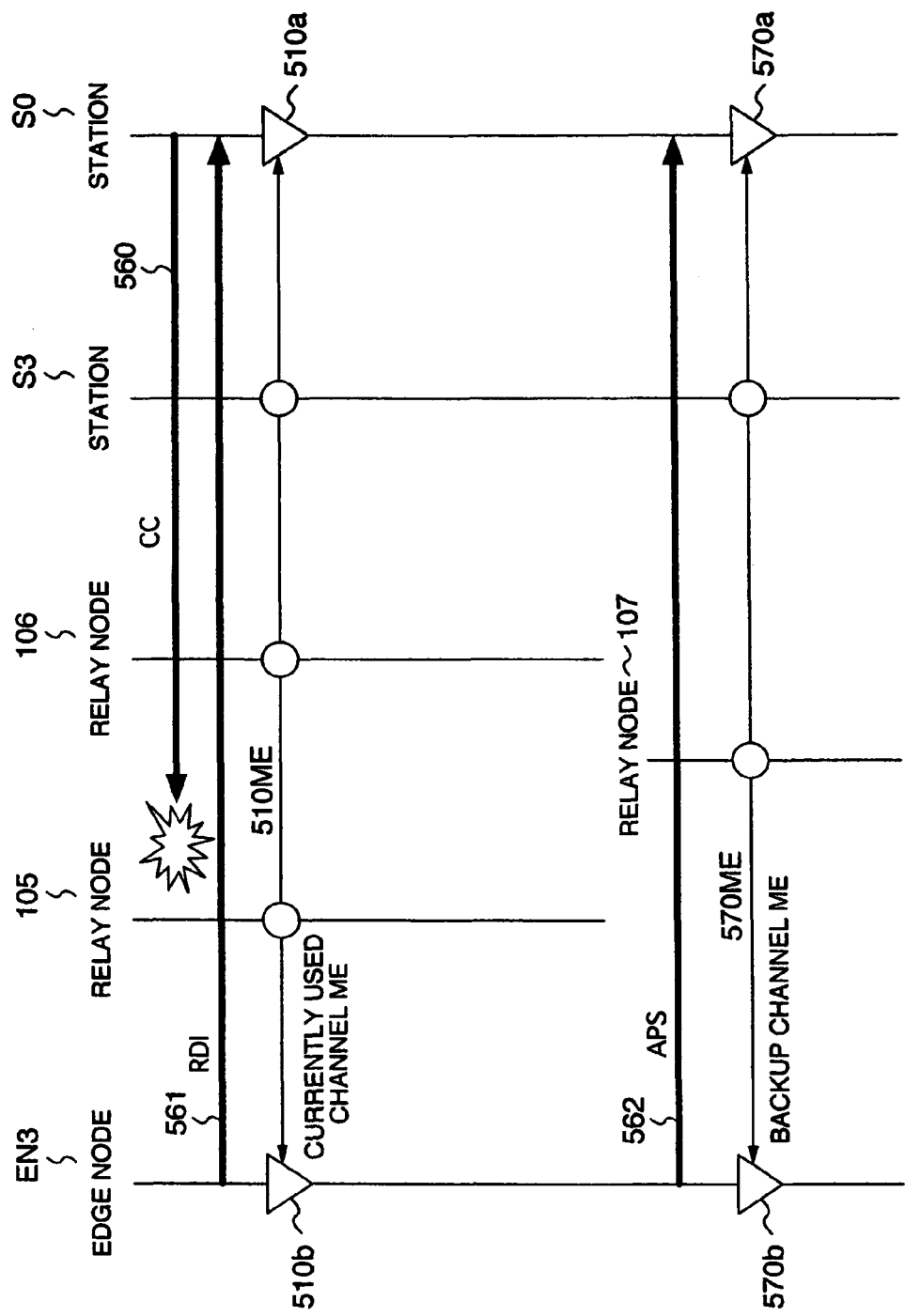
FIG. 8 shows an ME setting method in the branched line.
Figure 9:
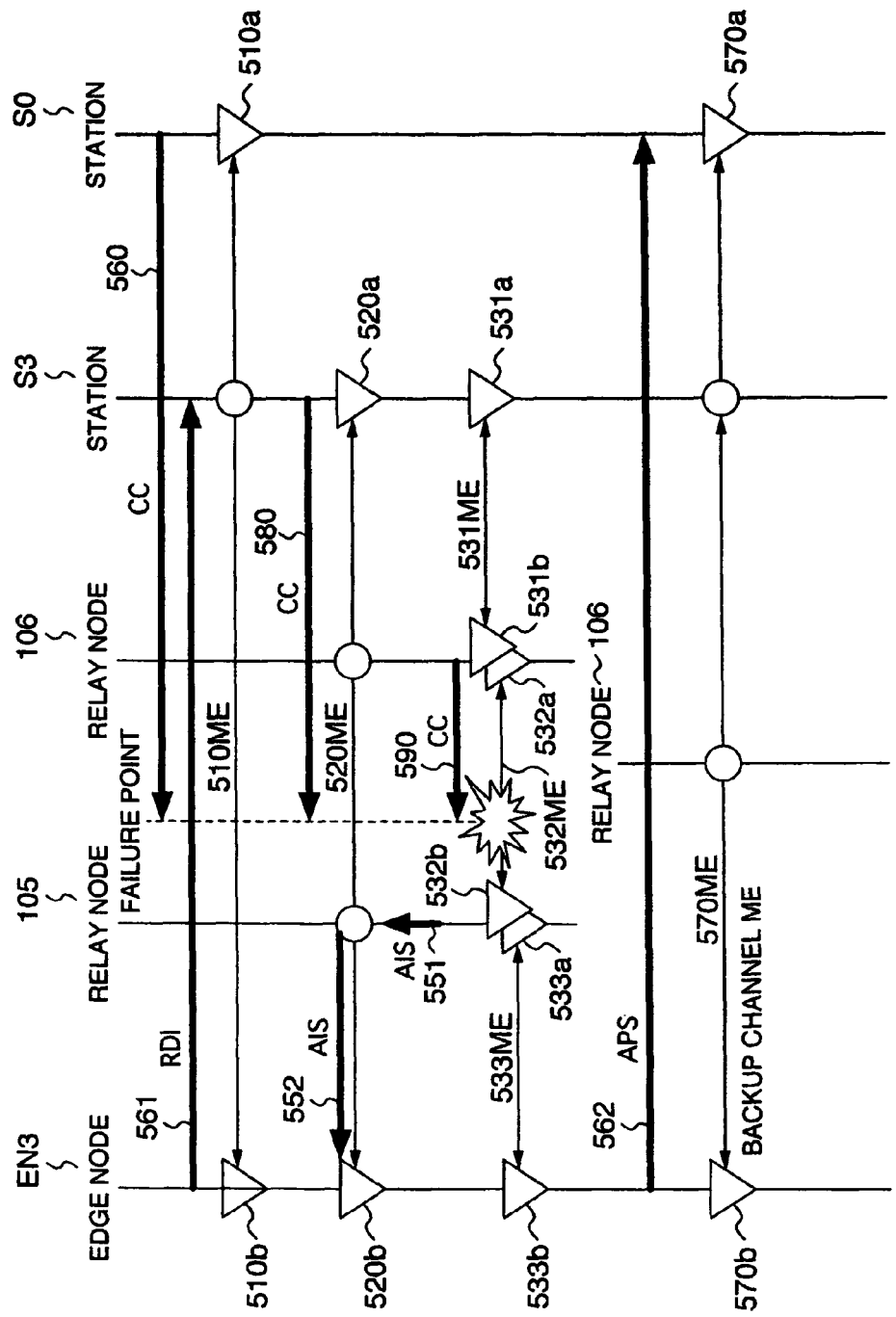
FIG. 9 shows a failure detection operation example when the ME is hierarchically set.
Figure 10:
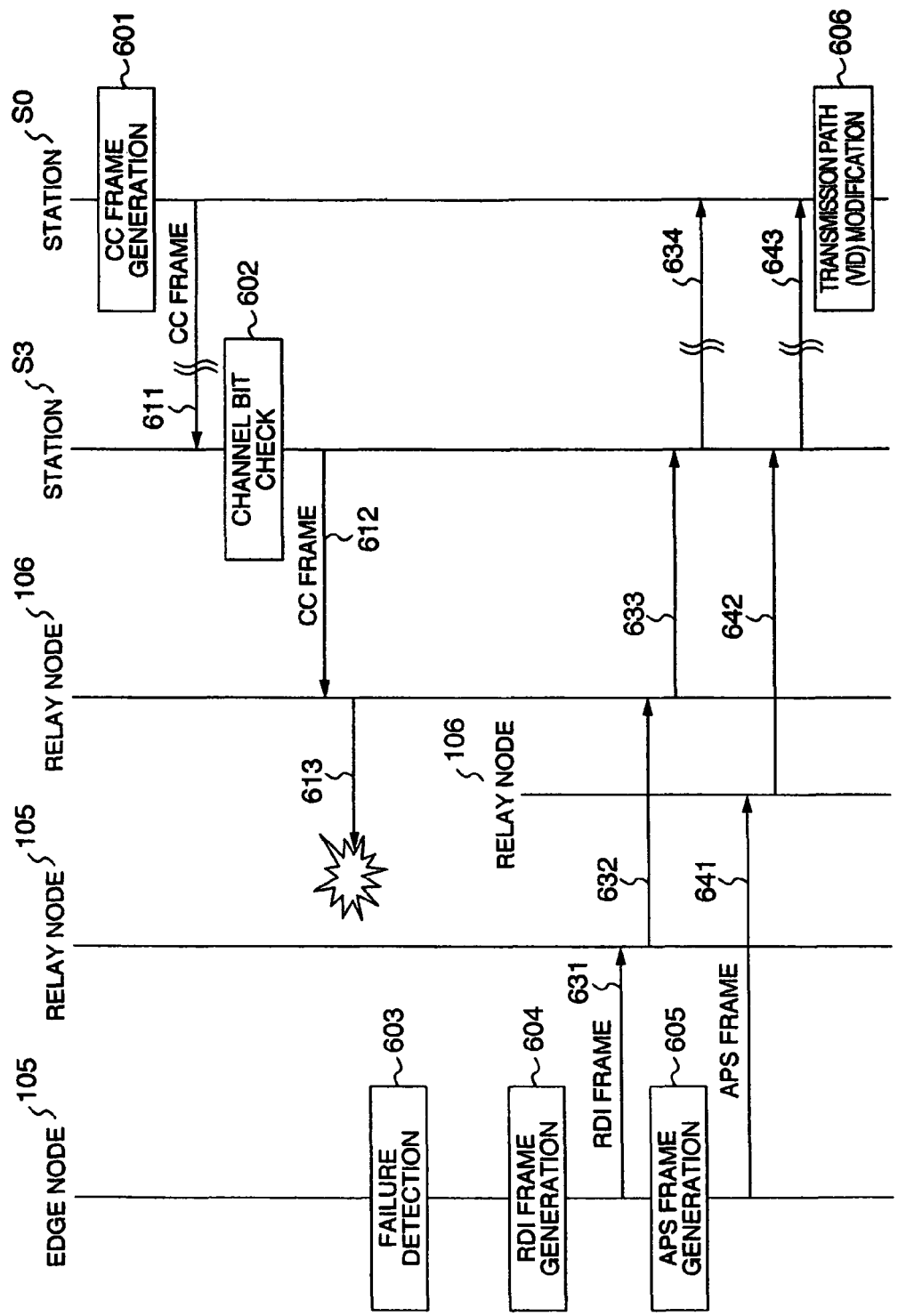
FIG. 10 shows a sequence explaining the process flow explained in FIG. 5 to FIG. 7 in the case of FIG. 8.
Figure 11:
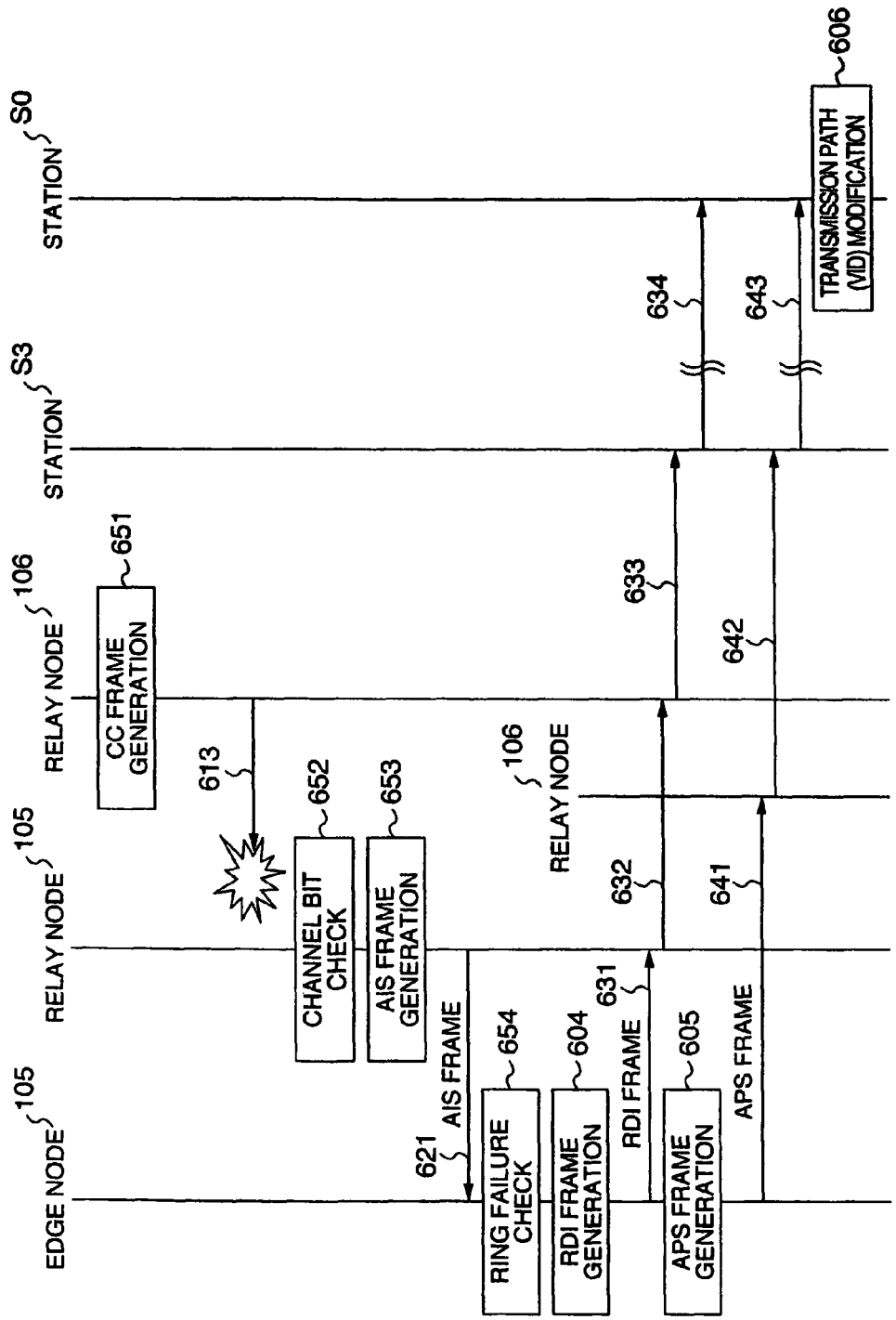
FIG. 11 shows a sequence explaining the process flow explained in FIG. 5 to FIG. 7 in the case of FIG. 9.
Figure 12:
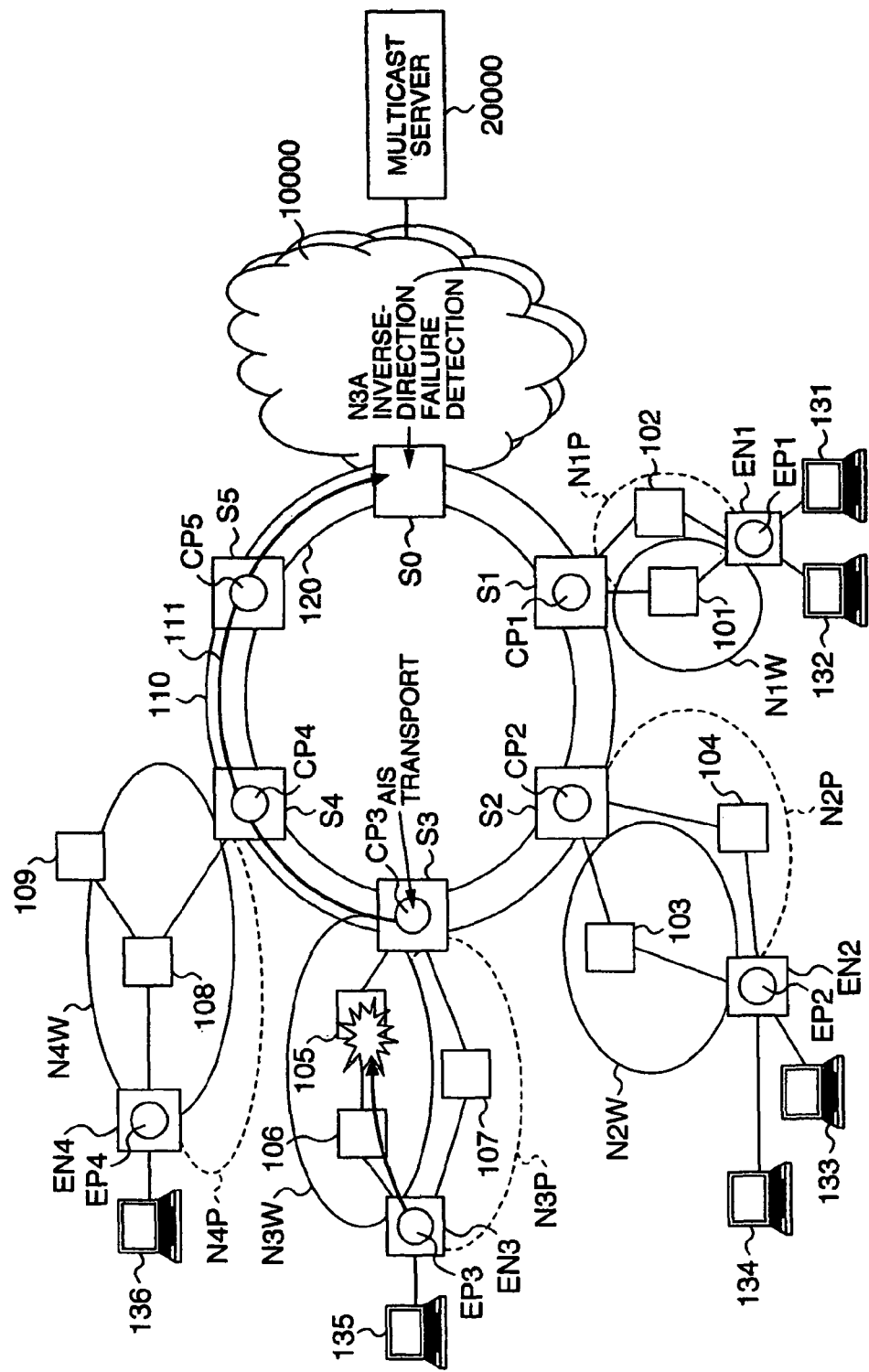
FIG. 12 shows a failure report method when a CC frame periodically transmitted in the path shown in FIG. 3 has detected a failure in the communication from an edge node to station S3 (called a reverse direction or an upstream direction).
Figure 13:
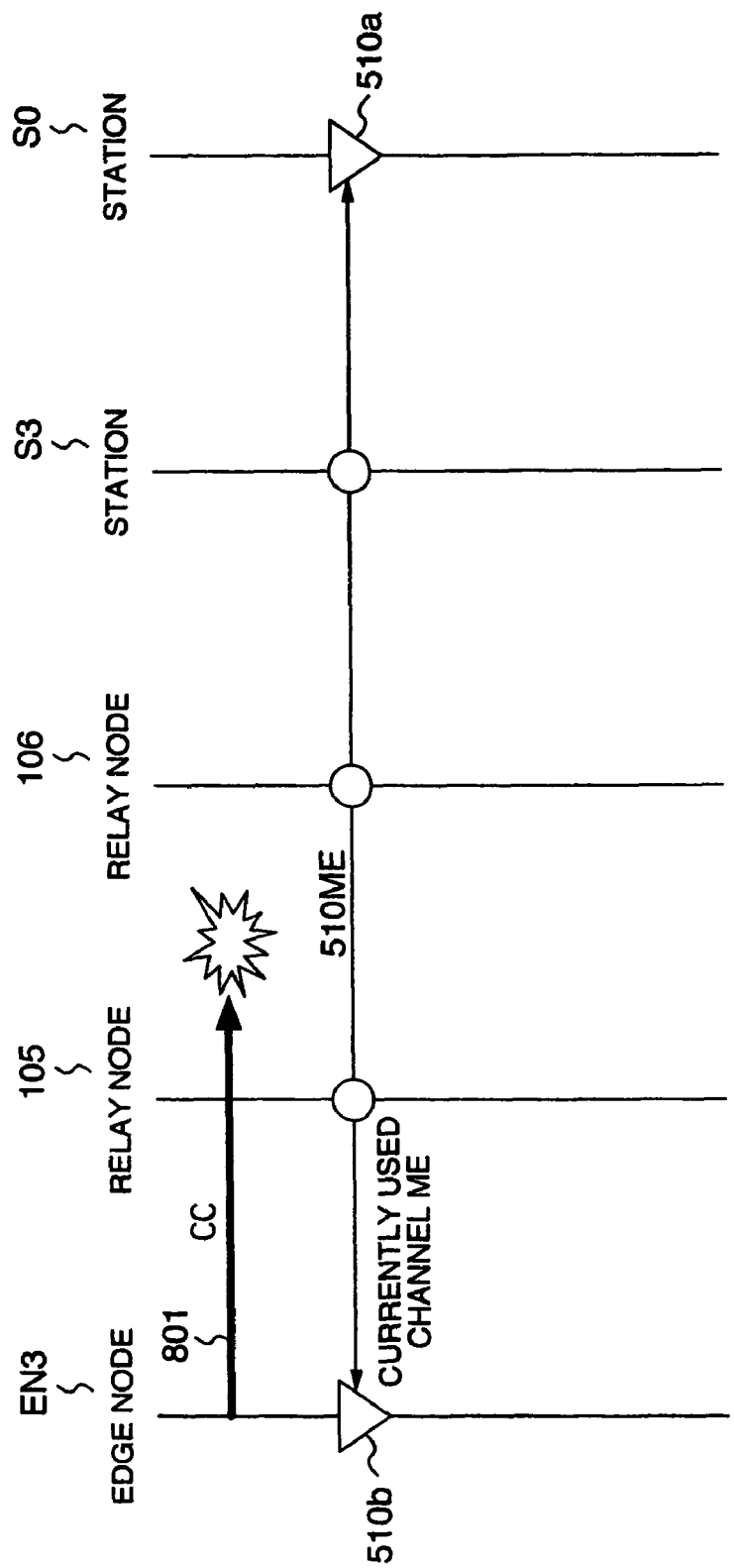
FIG. 13 explains the failure detection operation when only the end-to-end ME is set in the explanation of FIG. 12.
Figure 14:
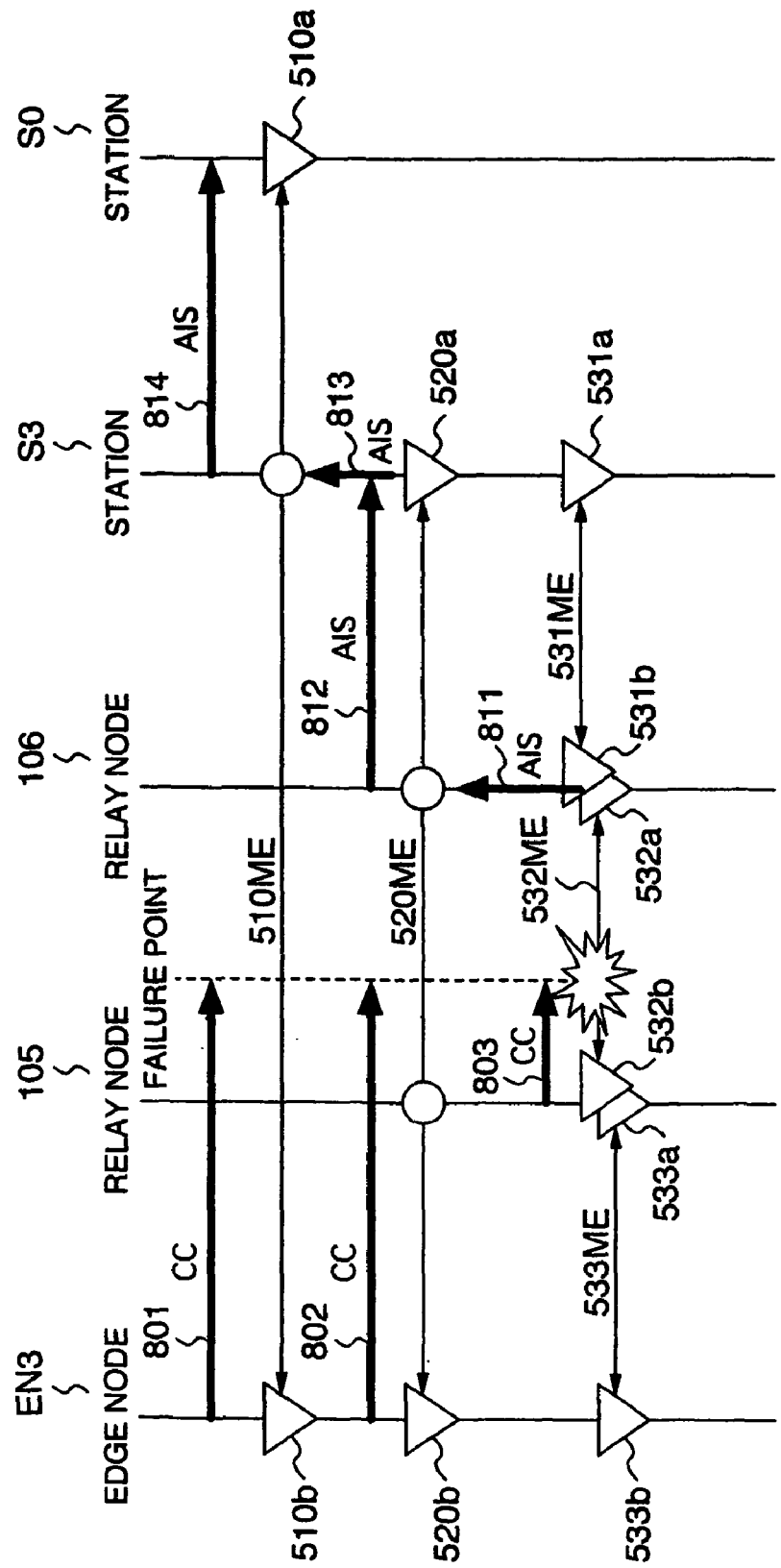
FIG. 14 explains the process for performing the failure detection shown in FIG. 12 when hierarchically setting the ME like in FIG. 9.
Figure 15:
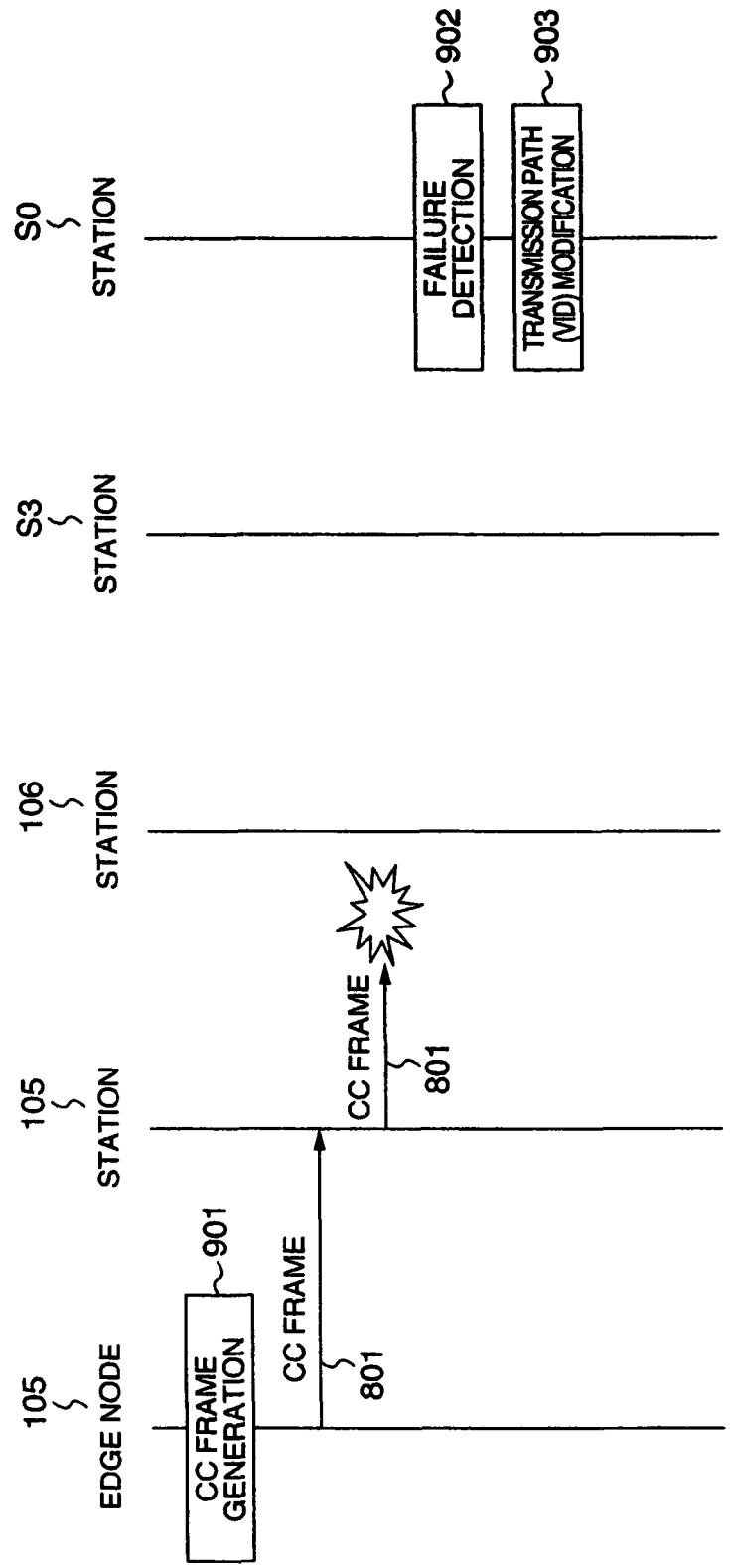
FIG. 15 shows a sequence explaining the failure information report process when the ME is set like in FIG. 13 in the case of failure detection of FIG. 12.
Figure 16:
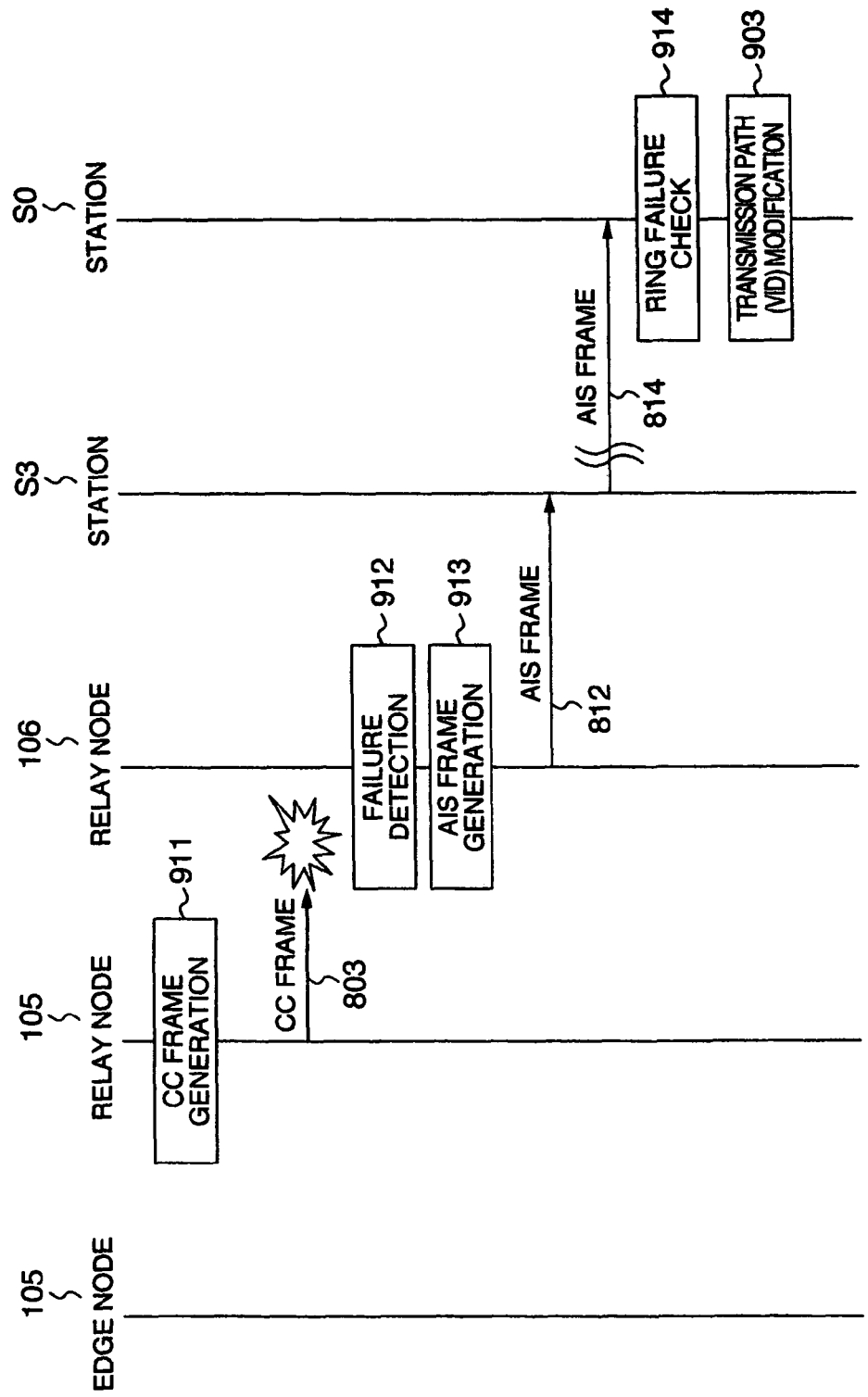
FIG. 16 shows a sequence of the failure detection operation when the CC is set like in FIG. 14.
Figure 17:
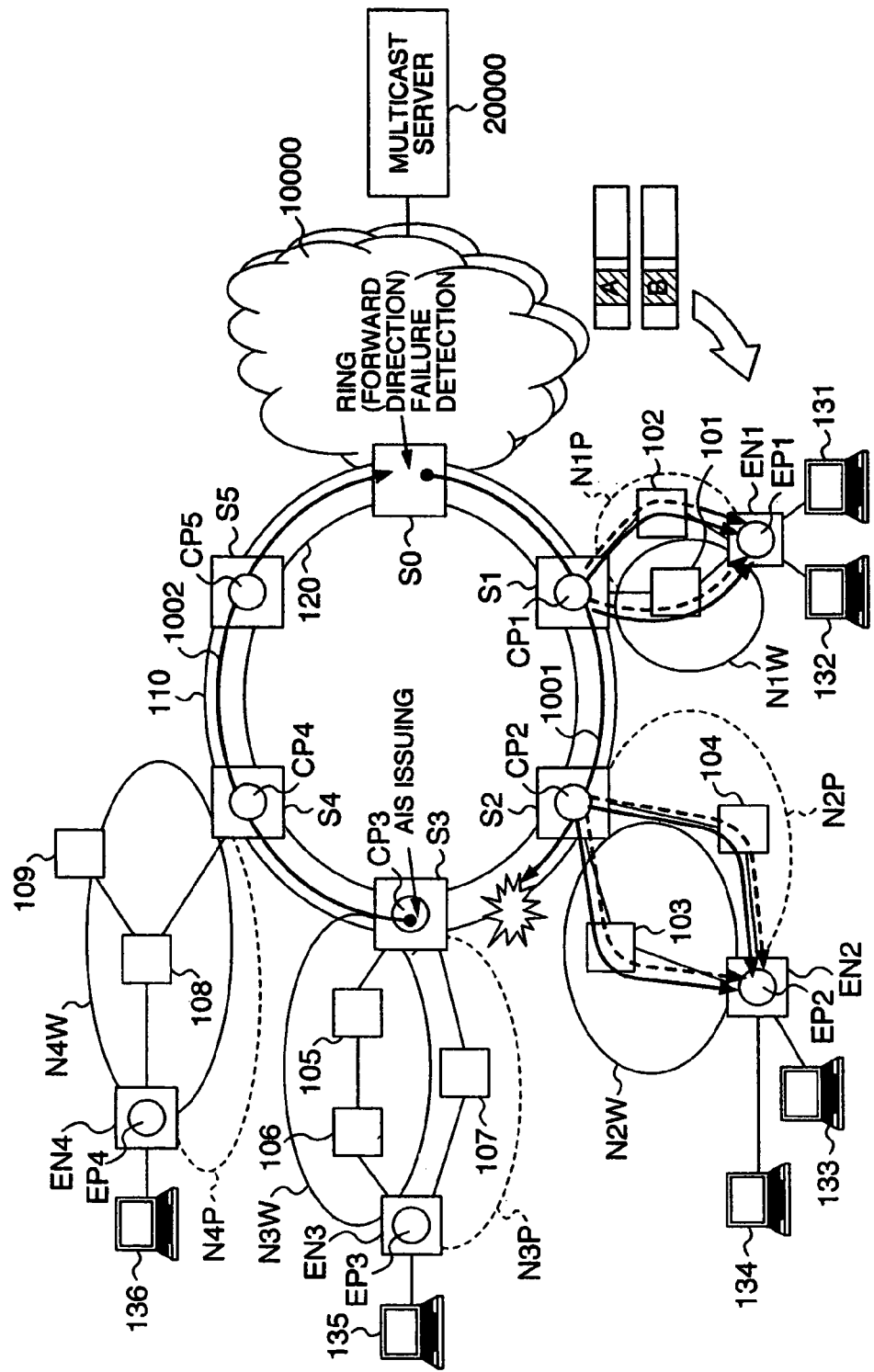
FIG. 17 shows a process when a failure has occurred in the ring trunk path.
Figure 18:
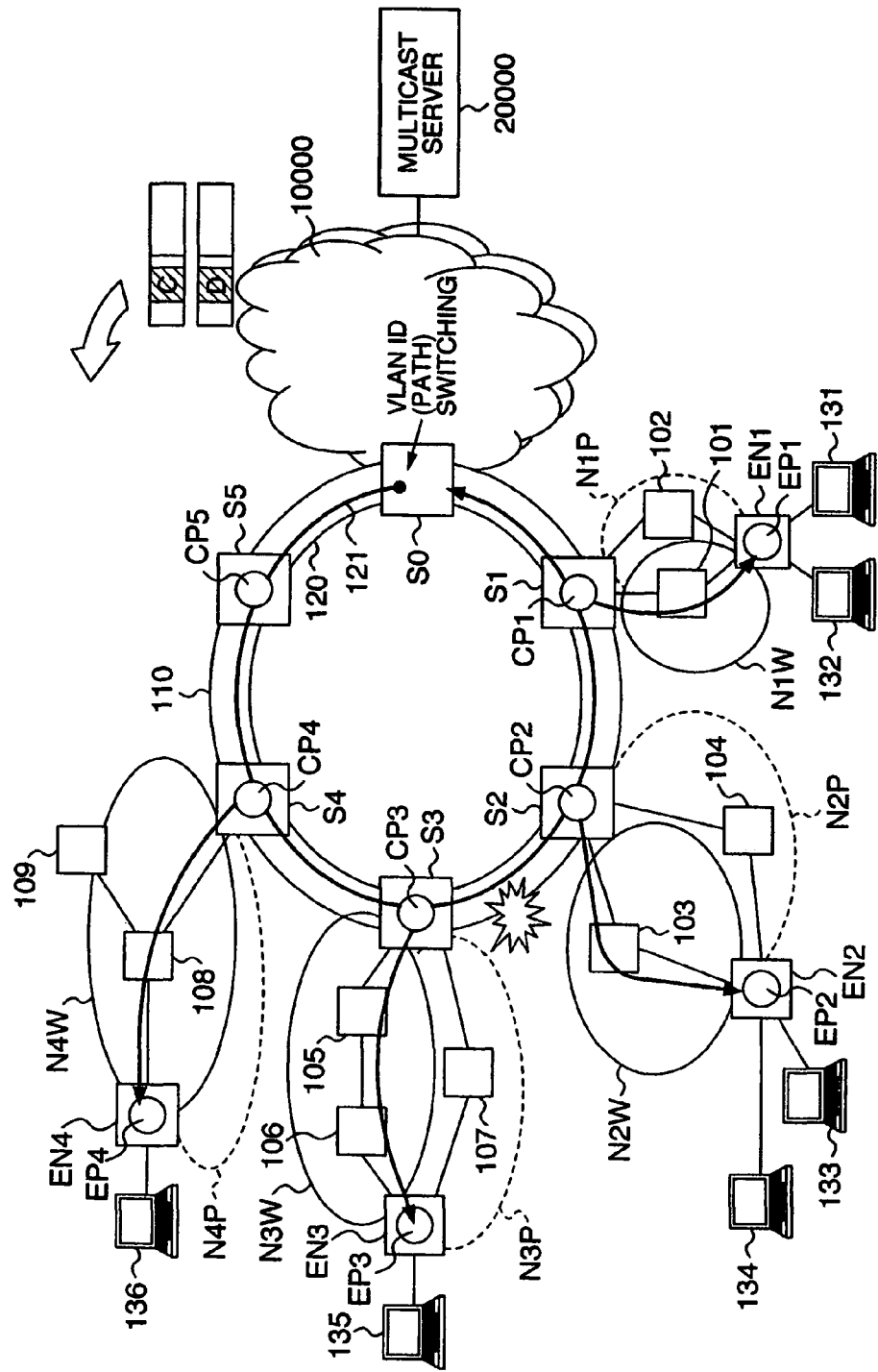
FIG. 18 shows a multicast flow communication path after switching when the second switching method is employed in the explanation of FIG. 17.
Figure 19:
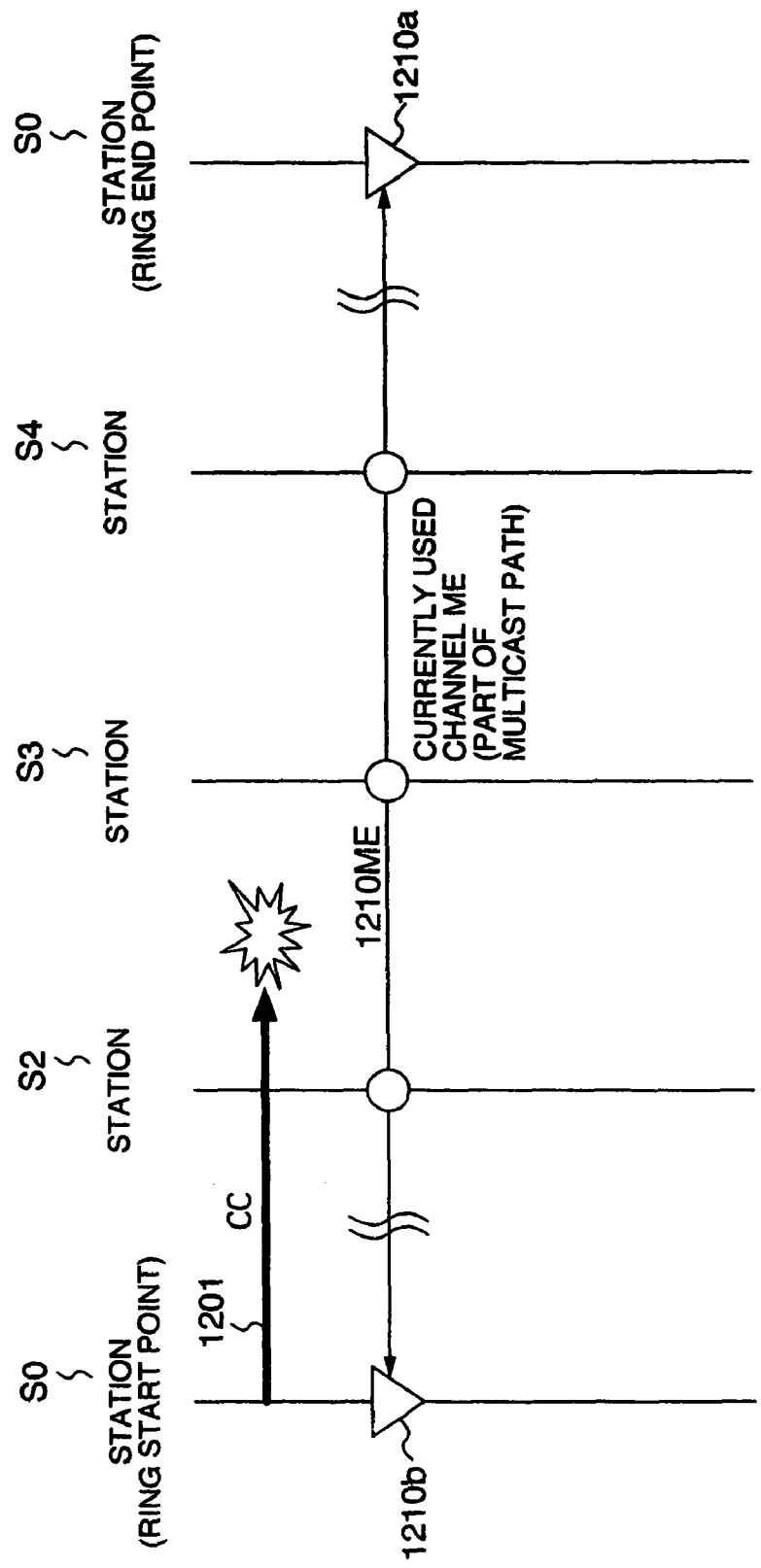
FIG. 19 explains the failure detection operation when only the end-to-end ME1210ME is set between the start point of the ring trunk (station S0 in the embodiment) and the end point (also station S0) of the ring trunk.
Figure 20:
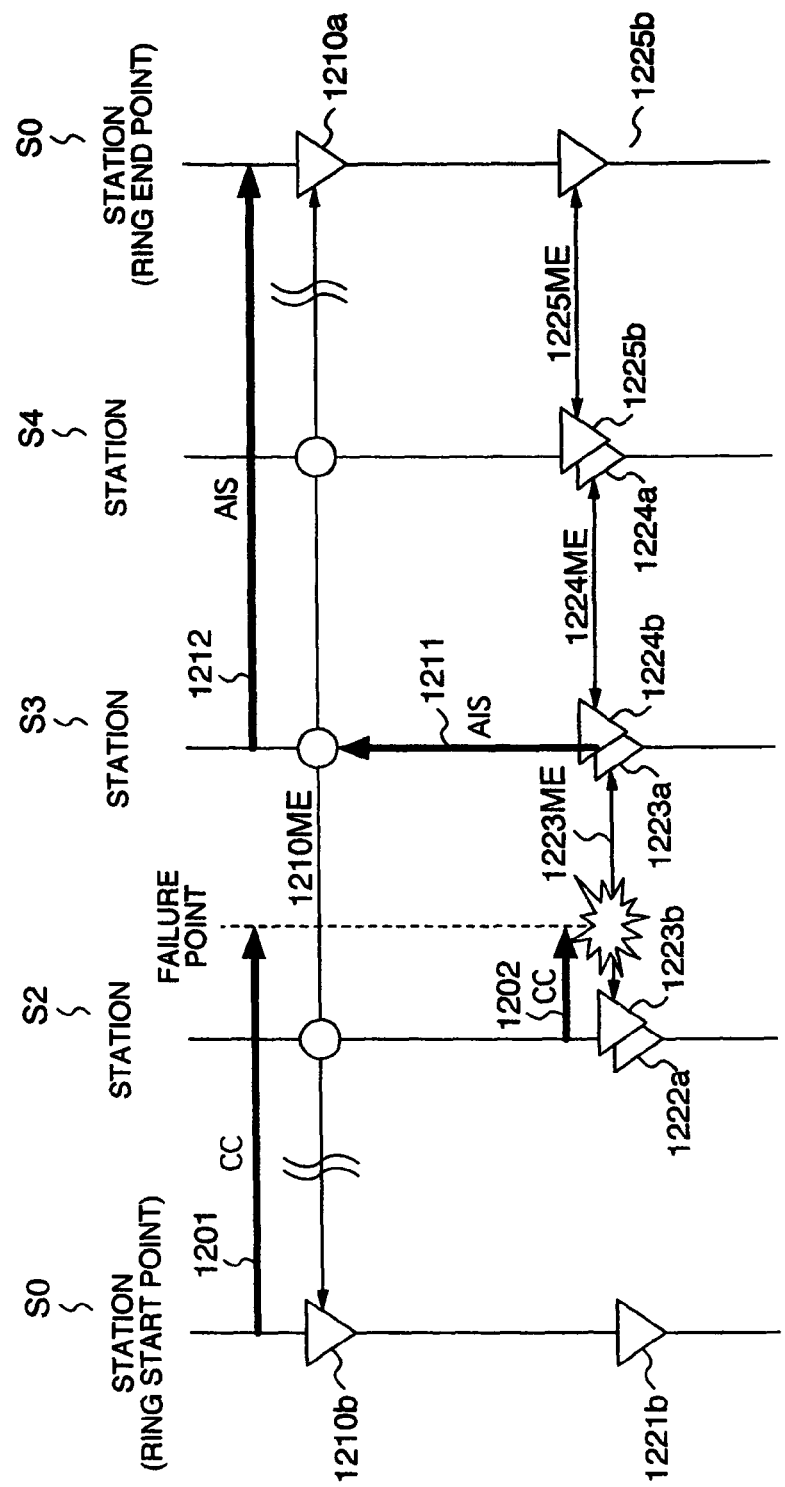
FIG. 20 explains a process when performing the failure detection of the ring trunk by hierarchically setting ME in the ring trunk.
Figure 21:
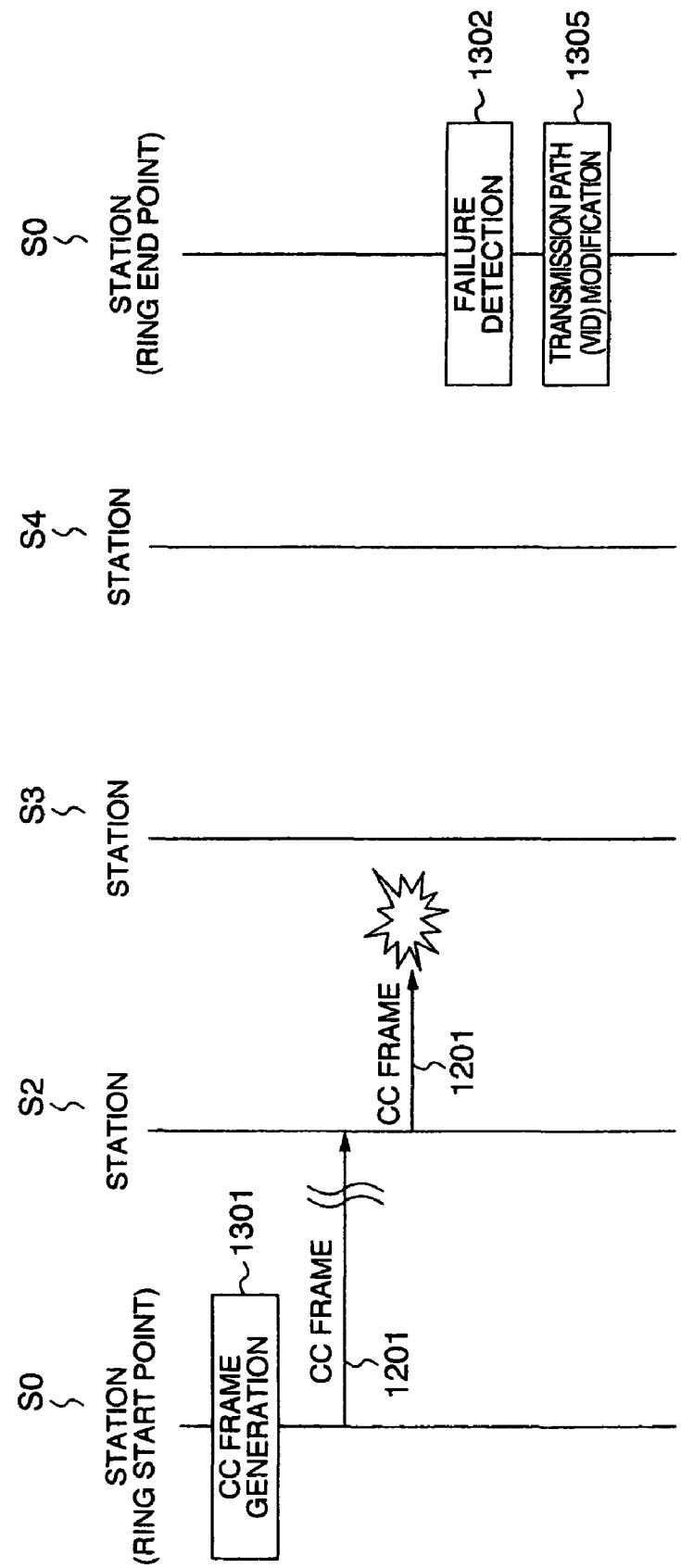
FIG. 21 shows a sequence which explains the failure information report process in the case of failure detection in FIG. 19.
Figure 22:
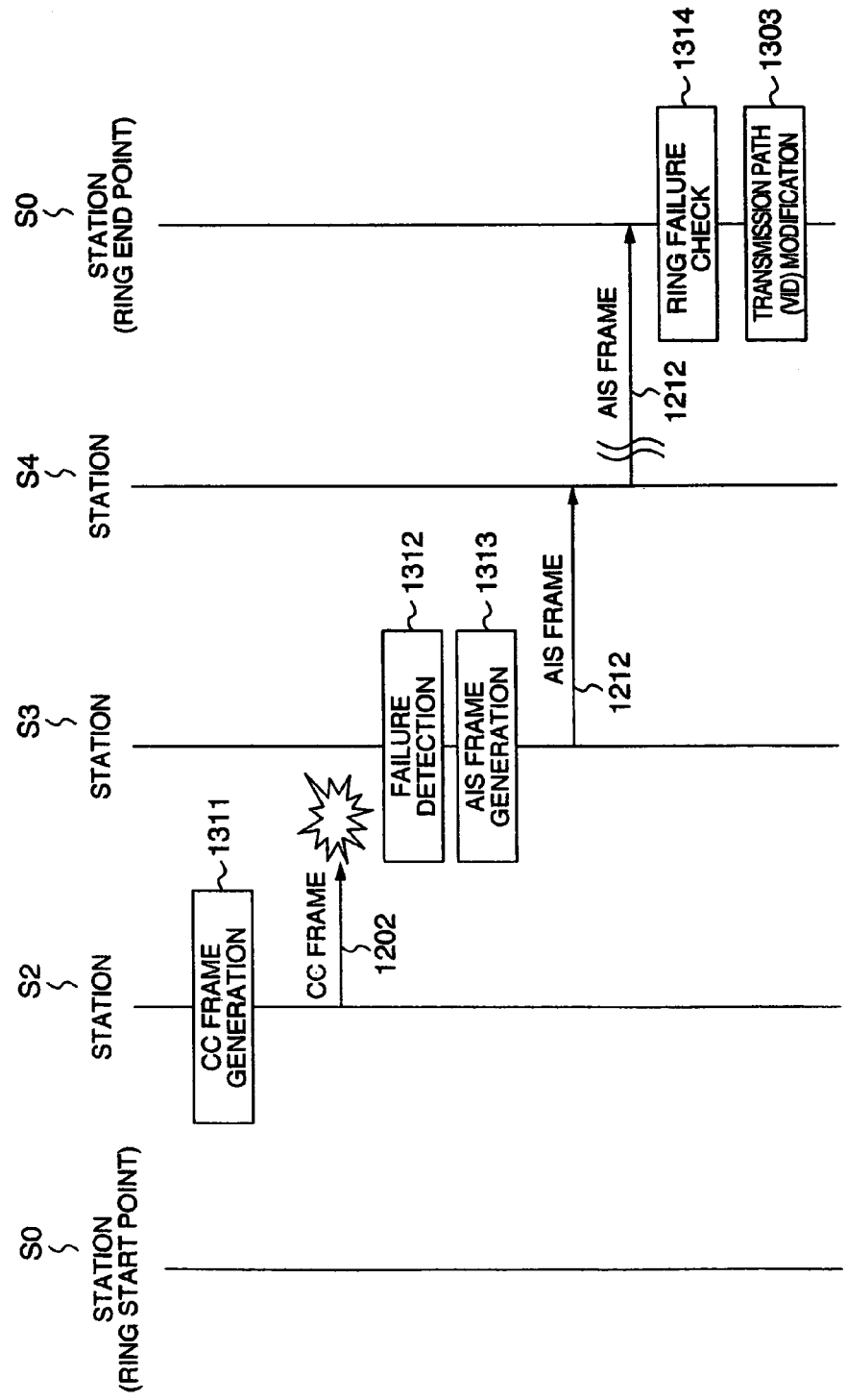
FIG. 22 shows a sequence indicating a ring trunk failure according to the path management method of FIG. 20.
Figure 23:
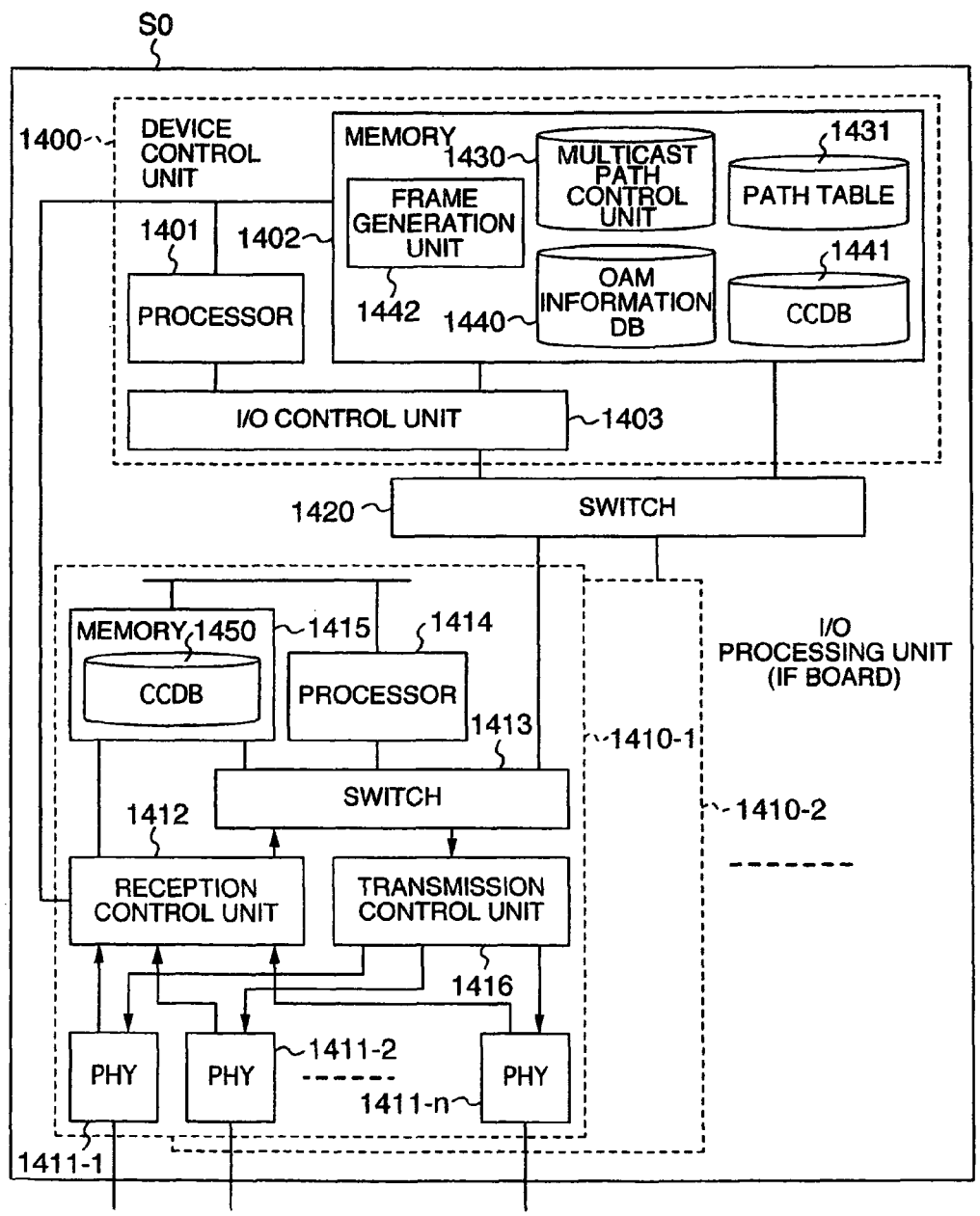
FIG. 23 is function block diagram showing a configuration example of a station constituting a ring and serving as a start point and an end point of the multicast path.
Figure 25:
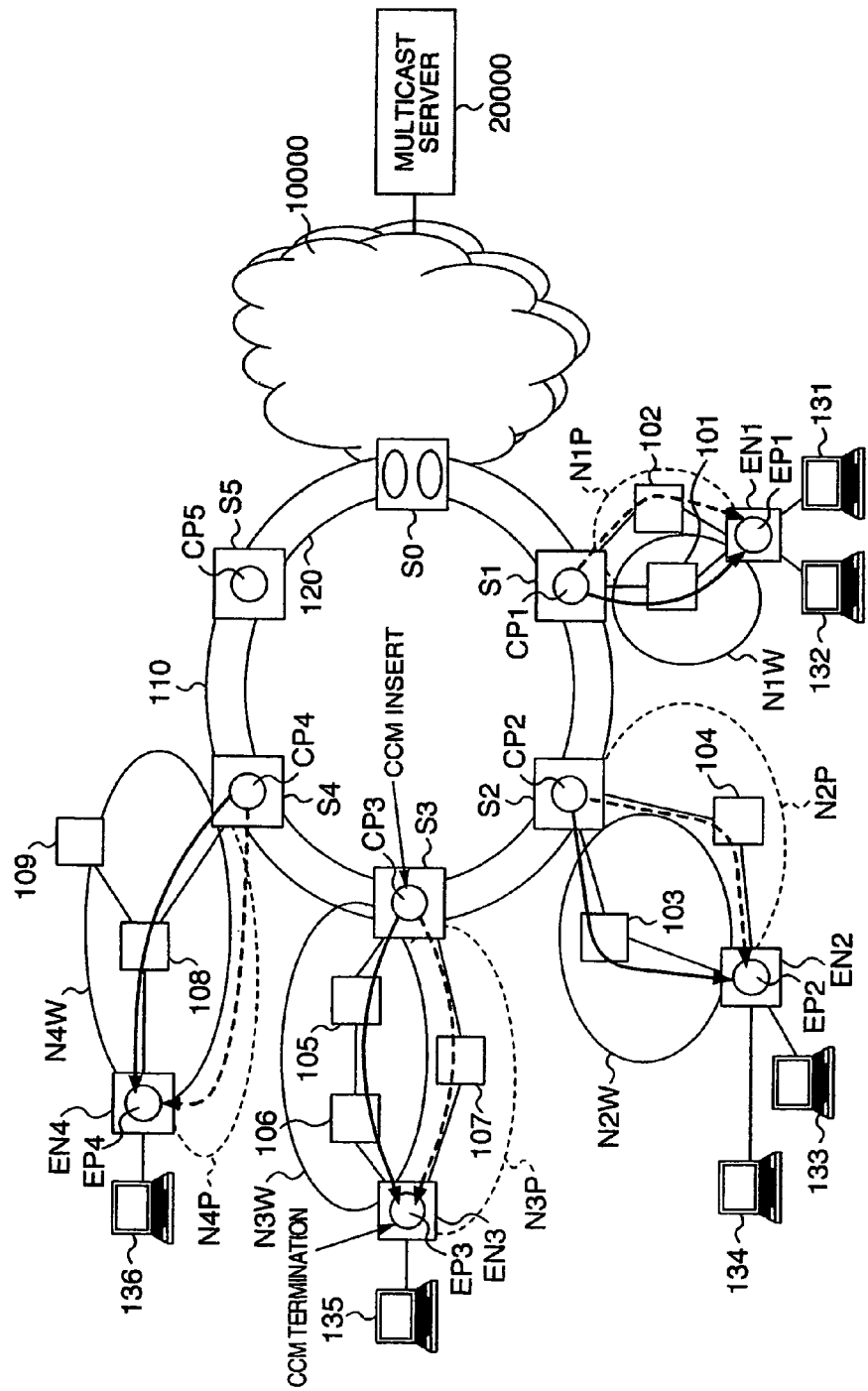
FIG. 25 shows an ME setting in a branched line and a CC frame transmission method for the forward direction.
Figure 26:
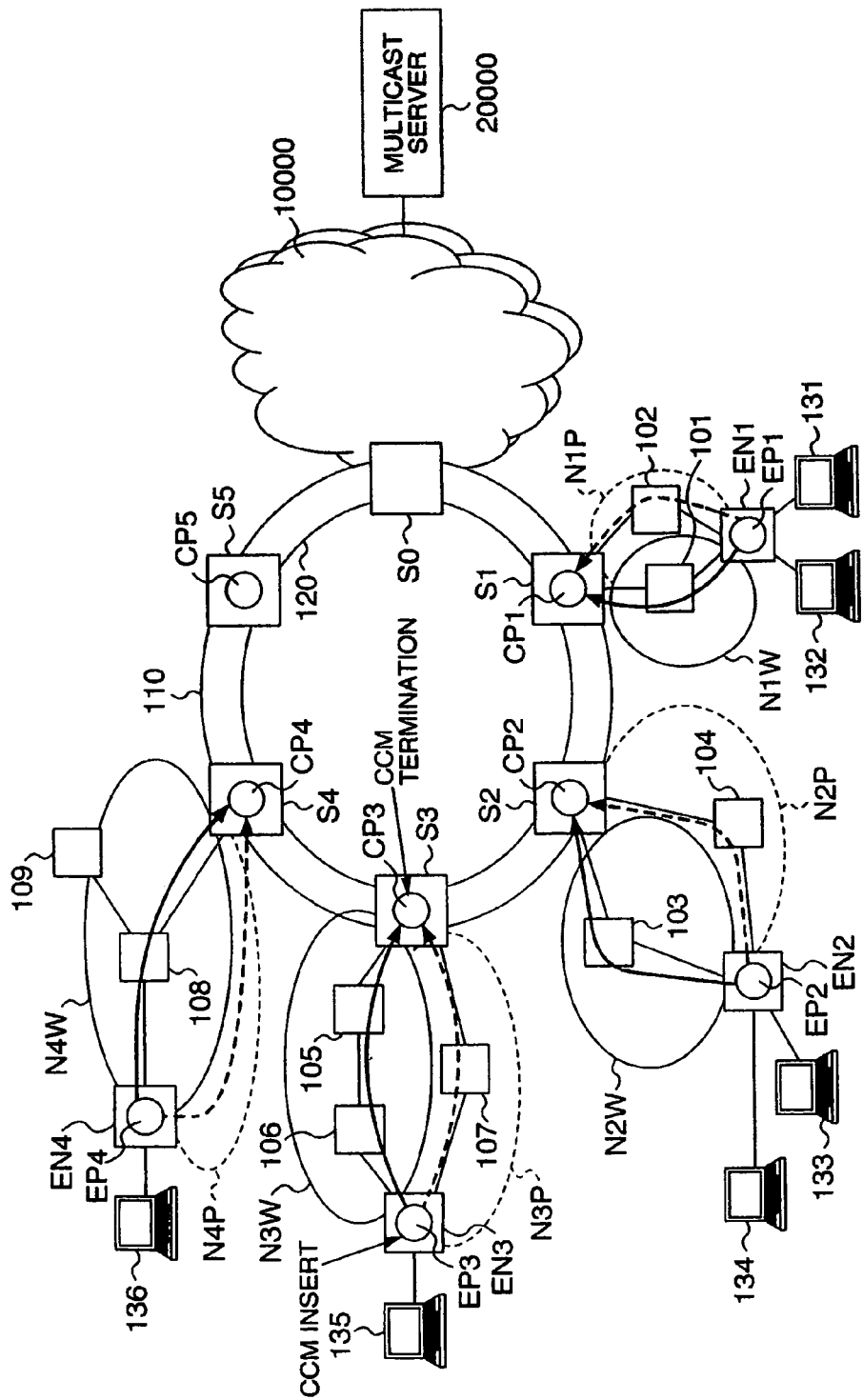
FIG. 26 shows an ME setting in a branched line and a CC frame transmission method for the reverse direction.
Figure 27:
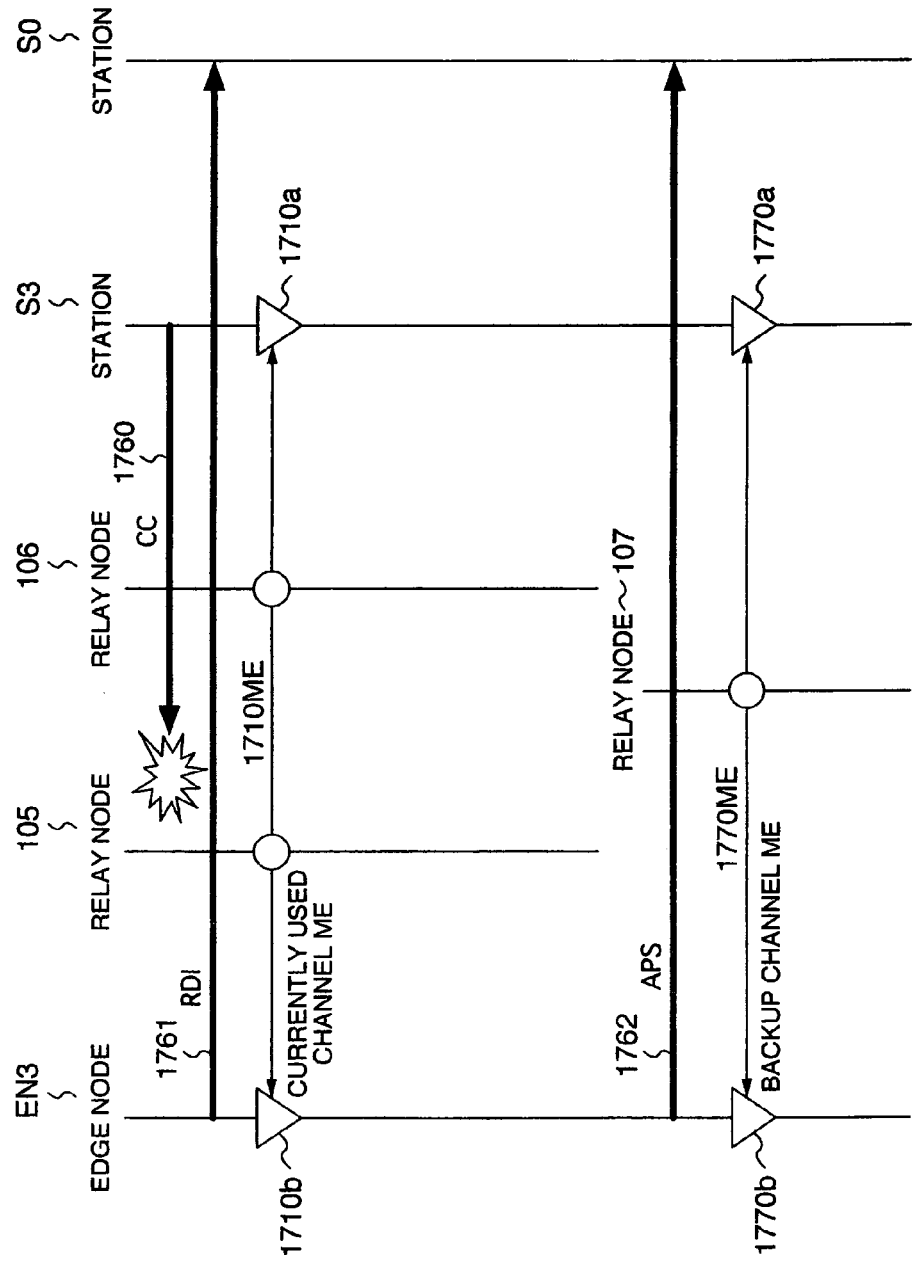
FIG. 27 shows a failure information processing method when an ME of a single hierarchy is set in the branched line.
Figure 28:
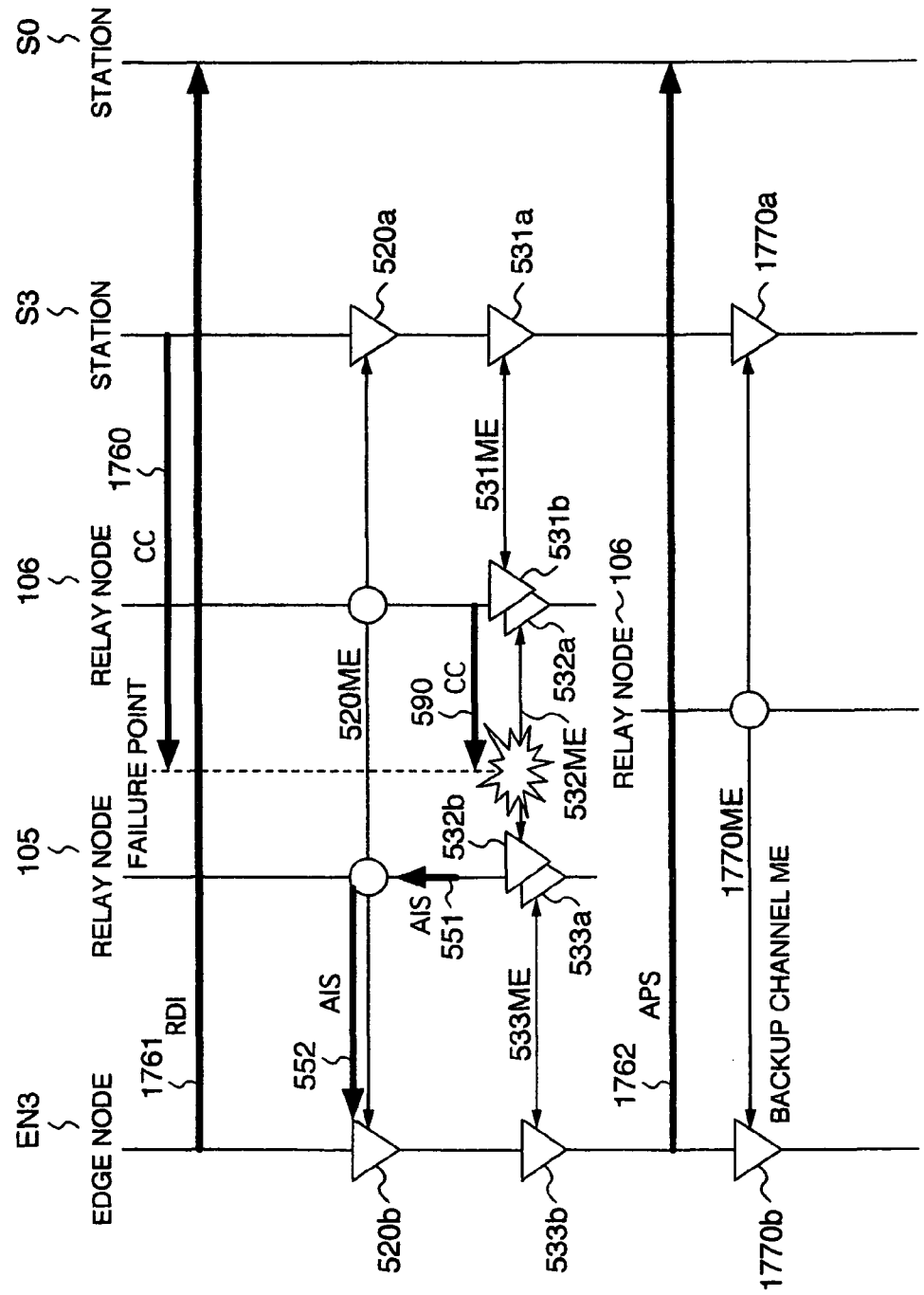
FIG. 28 shows a failure information process method when ME between nodes are set on branched lines so that the ME are hierarchically arranged.
Figure 29:
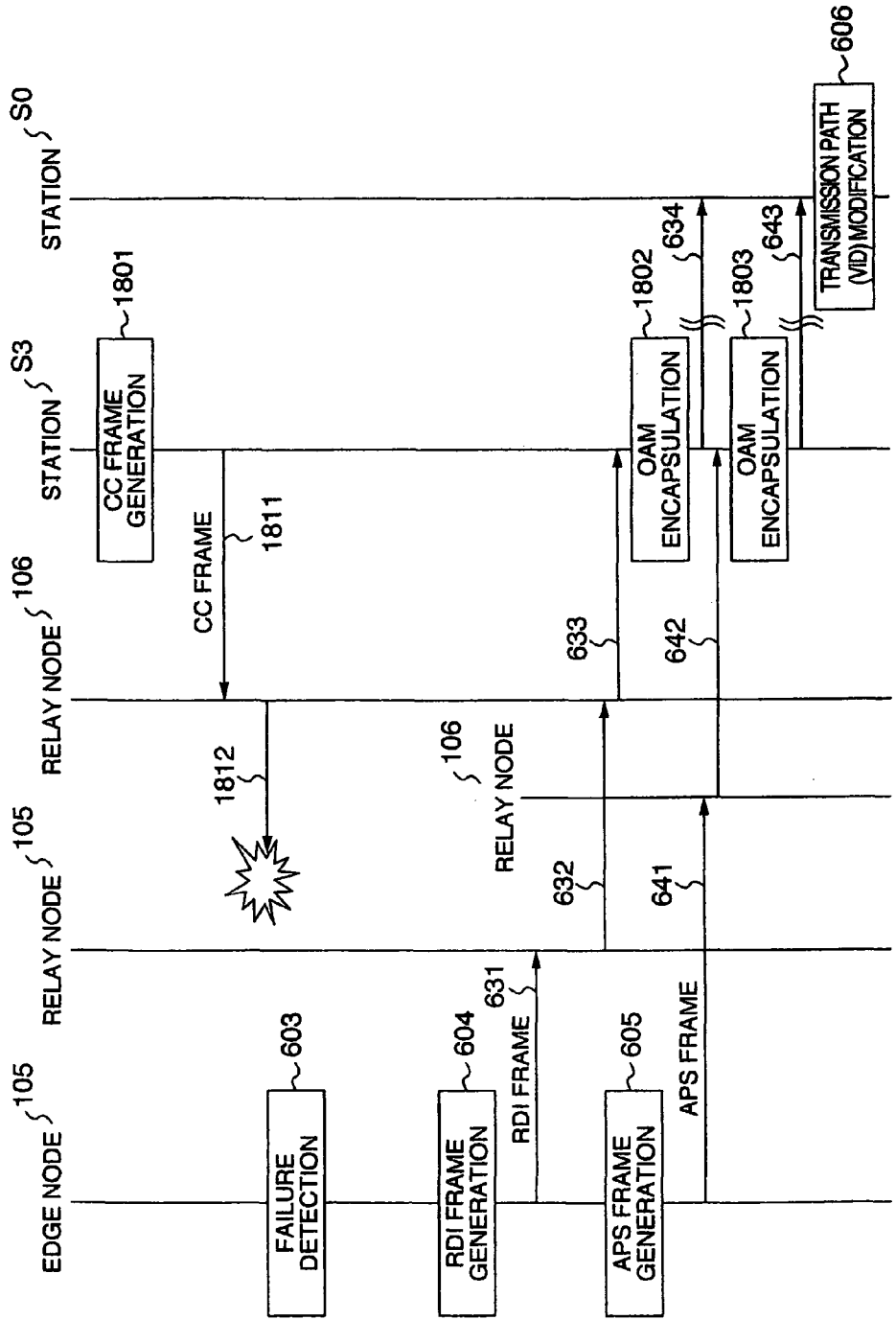
FIG. 29 shows a failure information process sequence in the case of FIG. 27.
Figure 30:
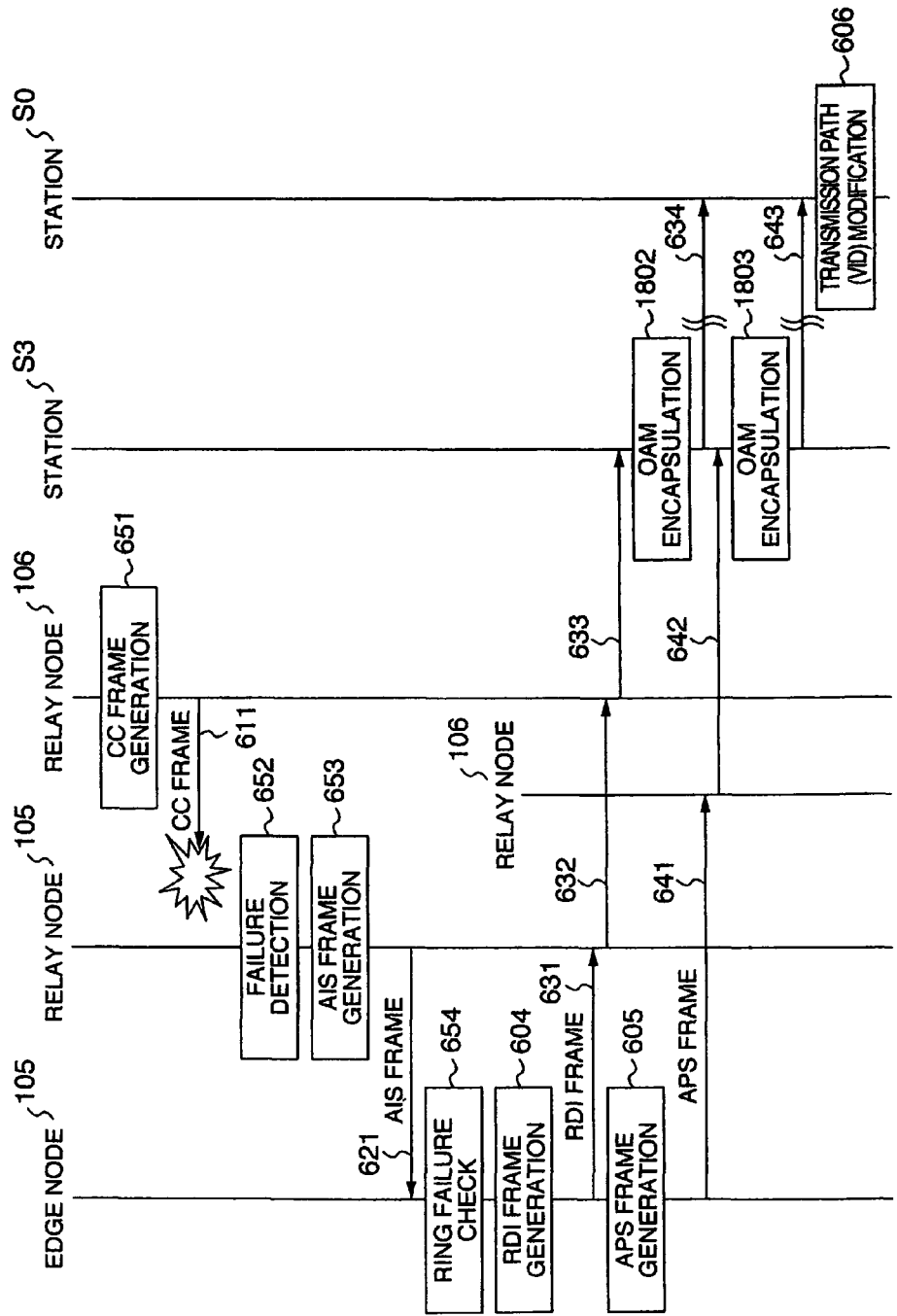
FIG. 30 shows a sequence when
Figure 31:
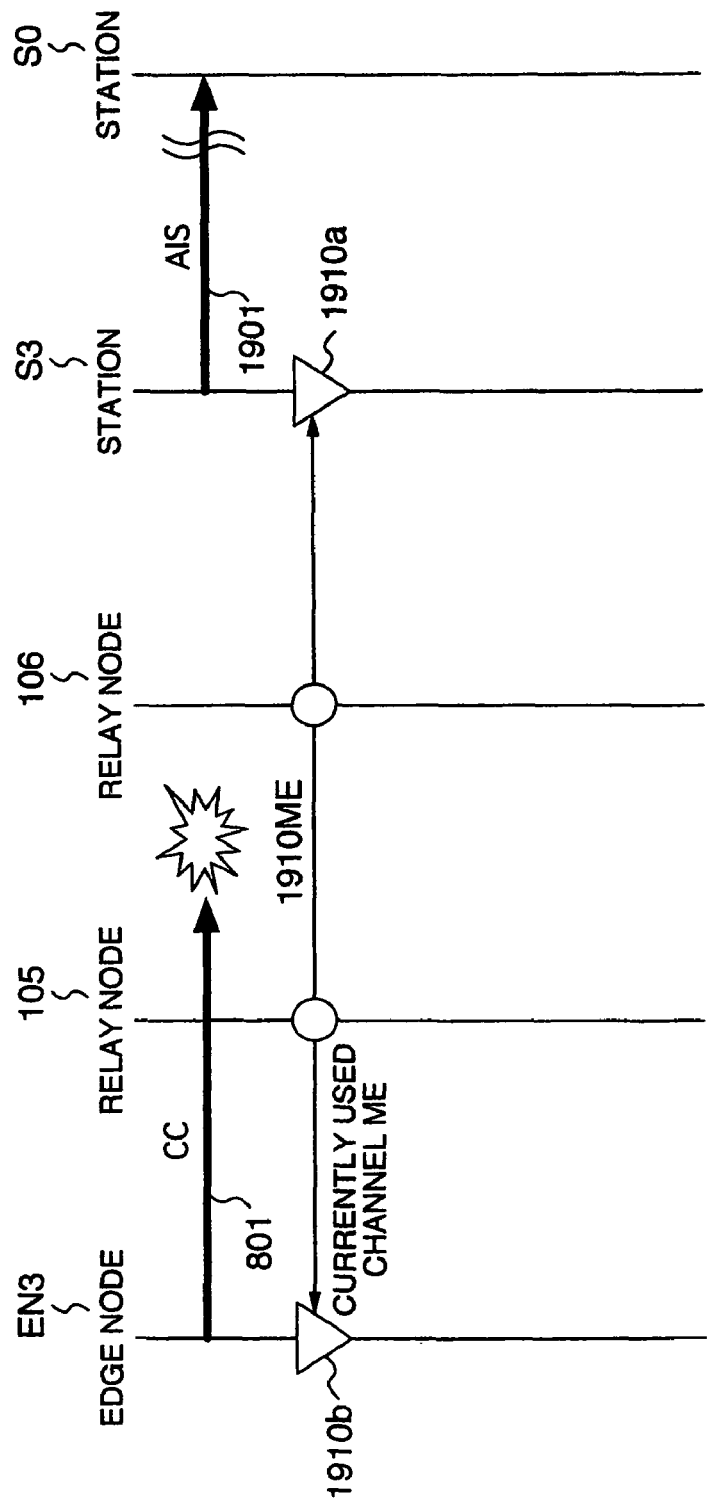
FIG. 31 shows a path management method (ME setting method) and a failure information process method in the reverse-direction communication path of a branched line when a single-hierarchy ME is set.
Figure 32:
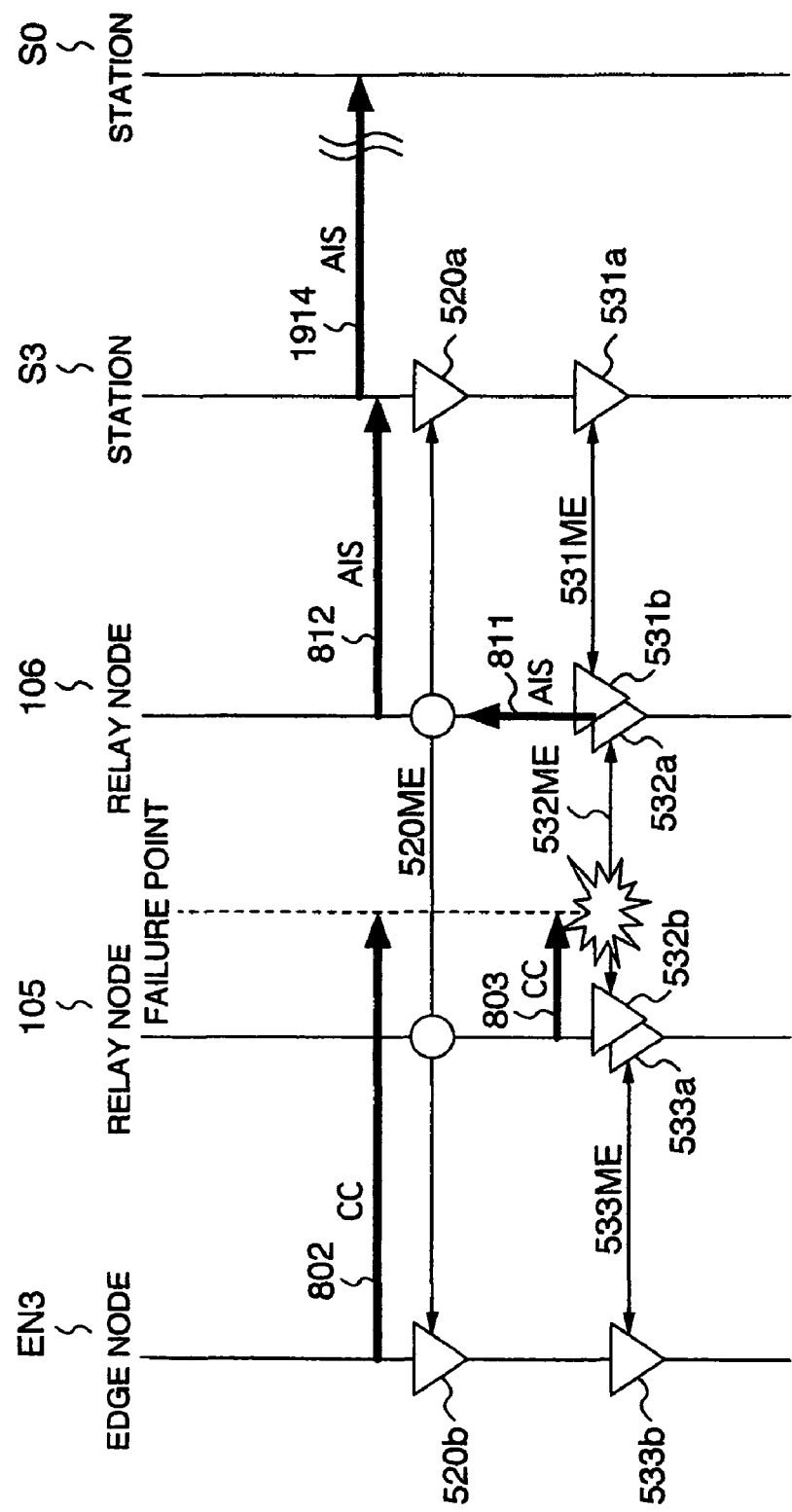
FIG. 32 shows a path management method (ME setting method) in the reverse-direction communication path of a branched line and a failure information process method.
Figure 33:
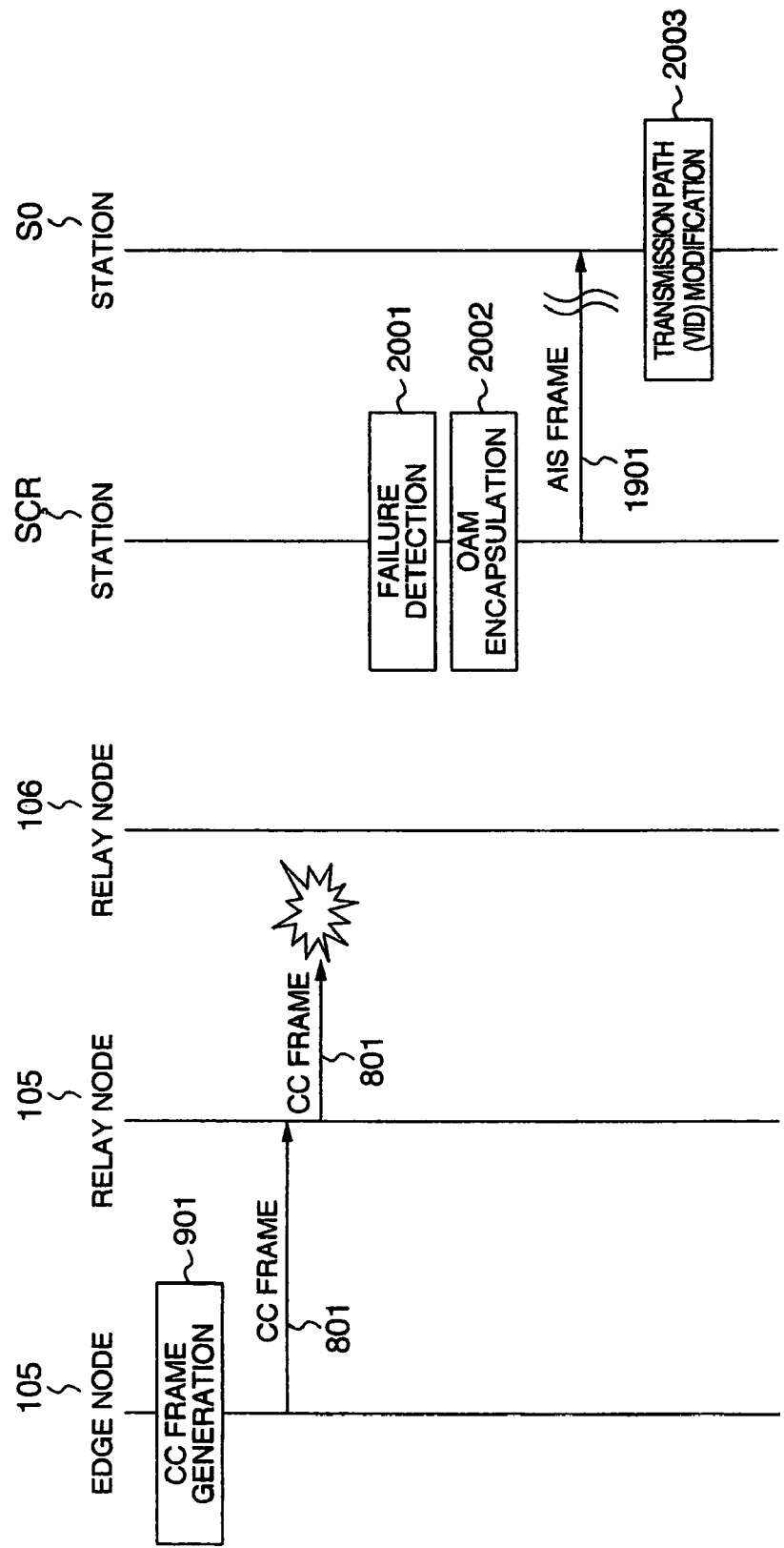
FIG. 33 shows a failure information process sequence in the case of FIG. 31.
Figure 34:
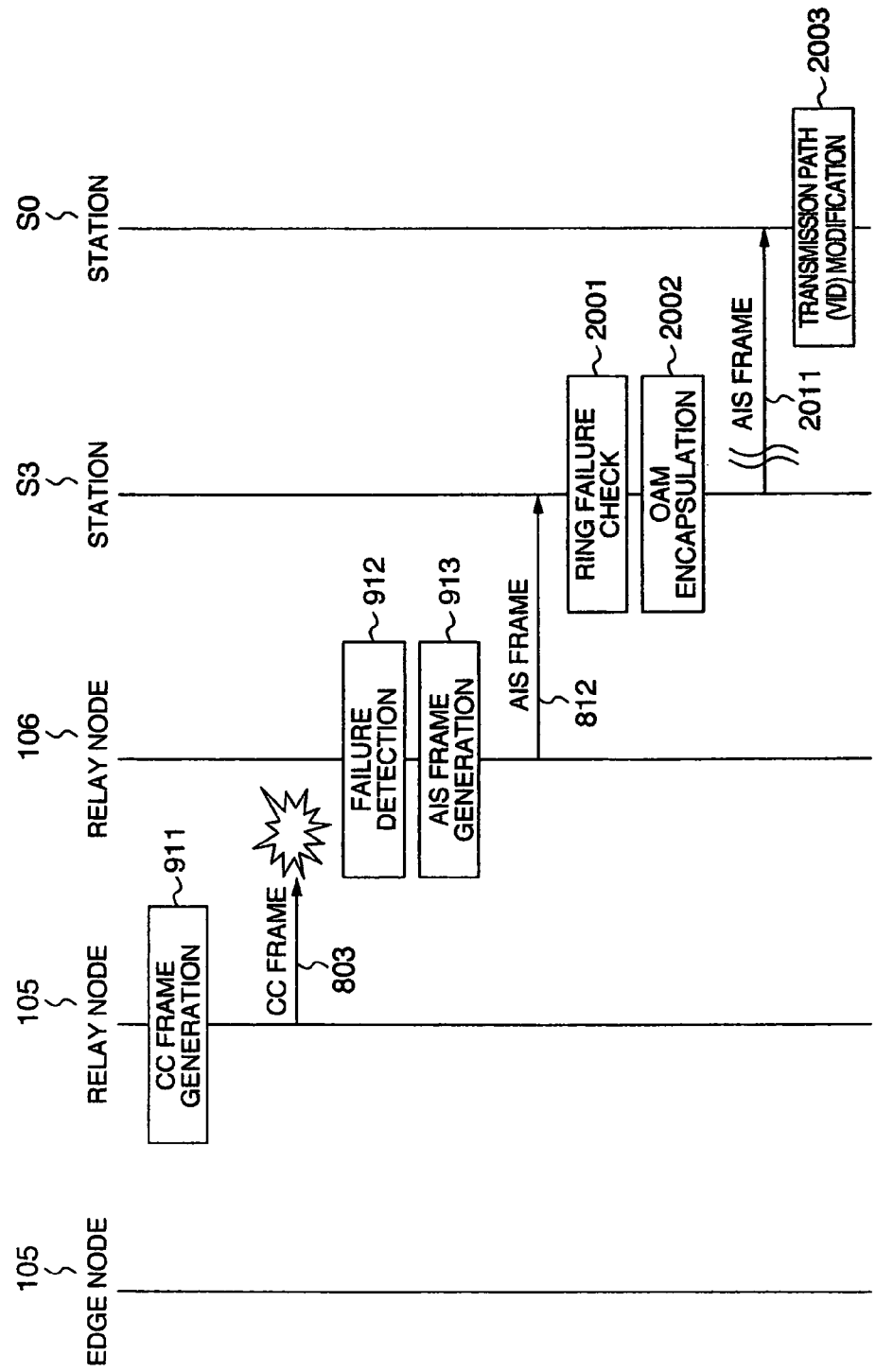
FIG. 34 shows a sequence when
Figure 35:
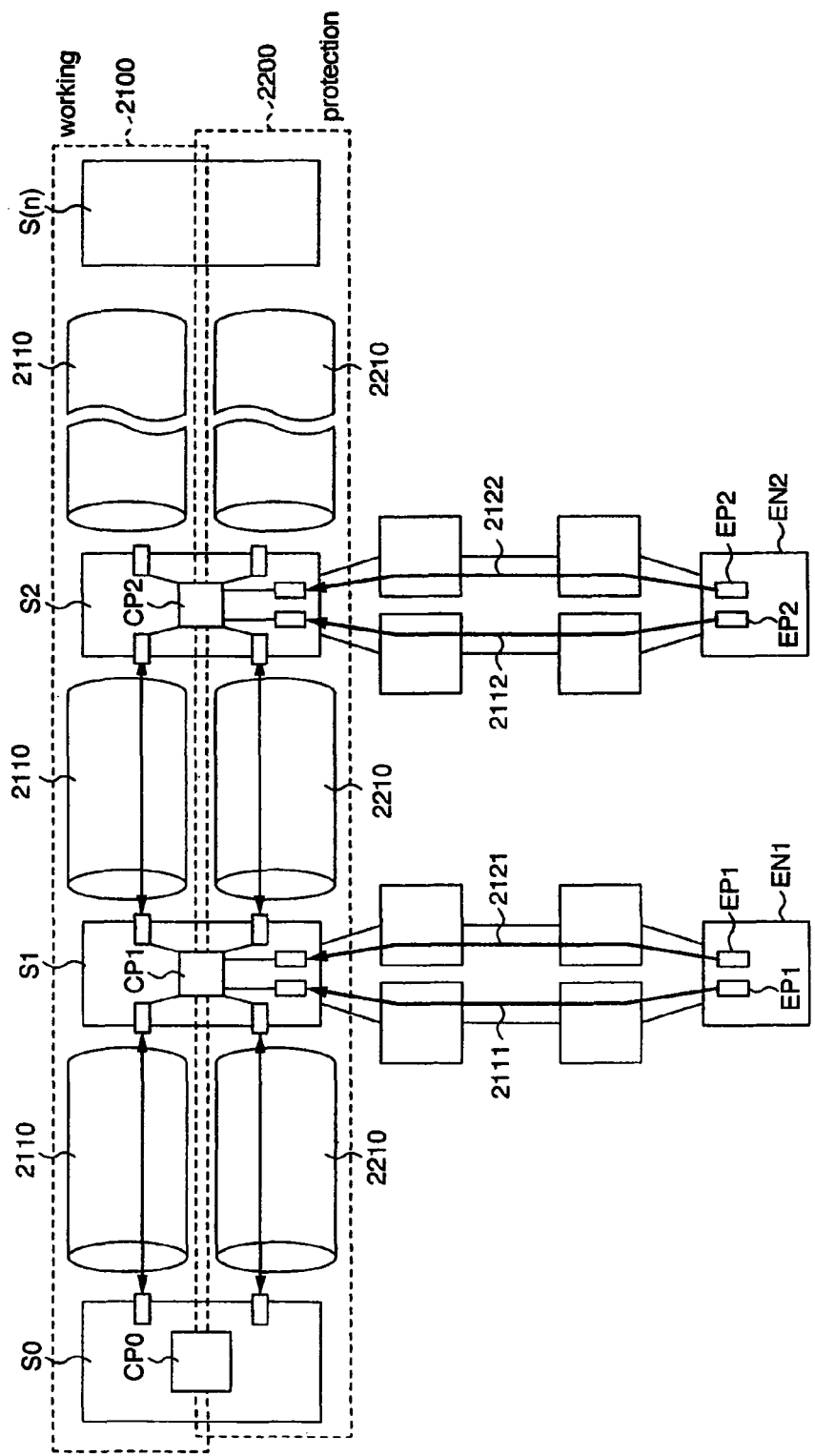
FIG. 35 shows a general configuration of a network which employs the present invention.
Figure 36:
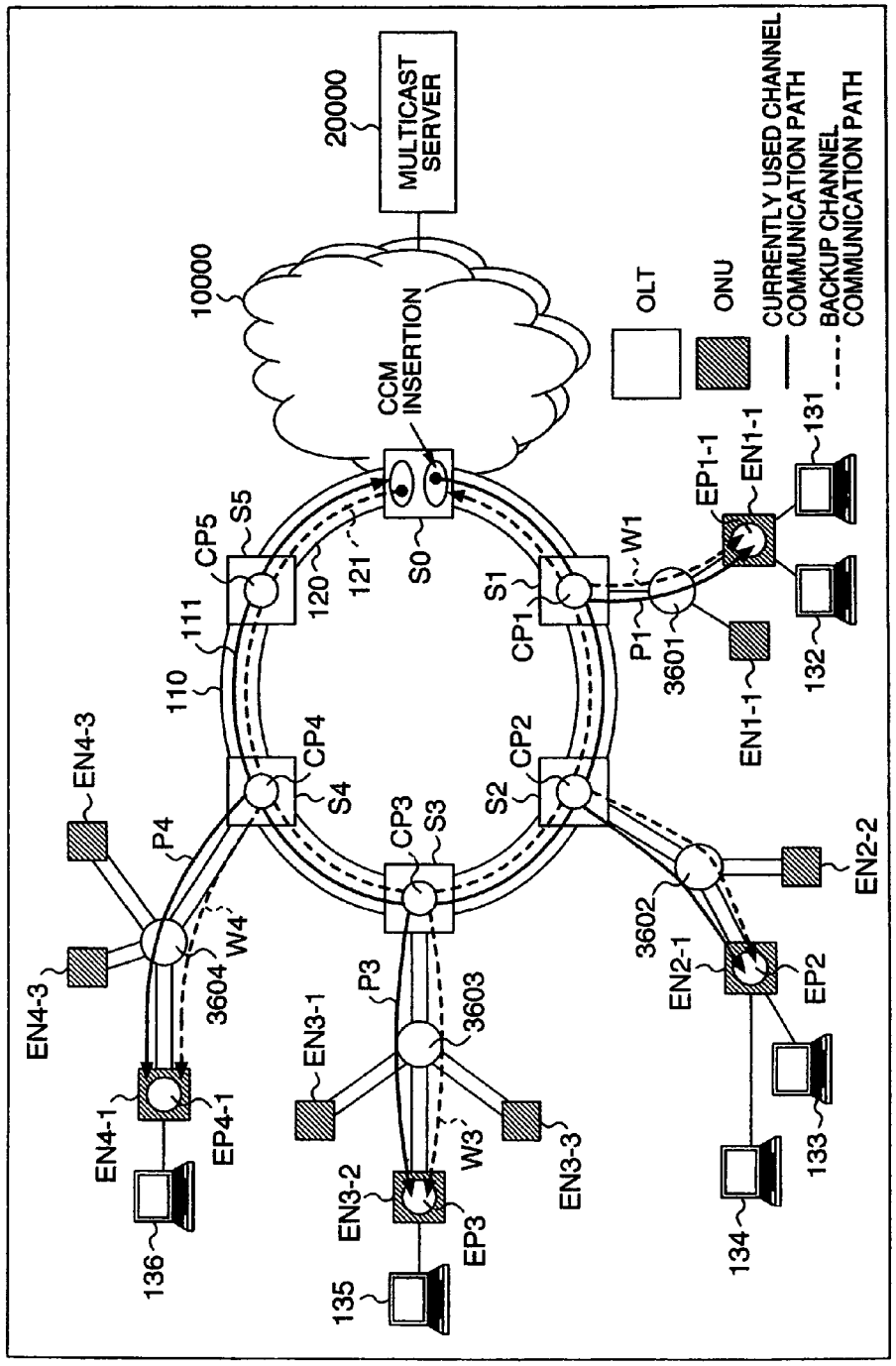
FIG. 36 shows a network configuration when the present invention is applied to an access line.

The invention claimed is:

1. A network system, comprising:
a first network and a plurality of second networks for transferring multicast data,
a first data transfer device connected to the first network,
a plurality of second data transfer devices connected to the first network and the plurality of second networks, and
a plurality of third data transfer devices each connected to a corresponding second network of the plurality of second networks, wherein
the multicast data is transferred from the first data transfer device via the second data transfer devices to each of the third data transfer devices in response to a request for the multicast data,
a currently used channel and a backup channel are set for a communication path between the first data transfer device and the second data transfer devices in the first network and for each communication path between the second data transfer devices and the third data transfer devices in the plurality of second networks, and
the first data transfer device transmits to each third data transfer device via the second data transfer devices maintenance management data for: a communication path connecting the currently used channel of the first network to the currently used channel of the corresponding second network for the third data transfer device; a communication path connecting the currently used channel of the first network to the backup channel of the corresponding second network for the third data transfer device; a communication path connecting the backup channel of the first network to the currently used channel of the corresponding second network for the third data transfer device; and a communication path connecting the backup channel of the first network and the backup channel of the corresponding second network for the third data transfer device.

2. The network system as claimed in claim 1, wherein the maintenance management data transmitted by the first data transfer device has a destination address which is a multicast address and a transmission source address which is an address of the first data transfer device.

3. The network system as claimed in claim 2, wherein when each of the third data transfer devices receives the maintenance management data transmitted from the first data transfer device and transmits maintenance data for the communication path connecting the currently used channel of the first network and the corresponding second network for the third data transfer device and for the communication path connecting the backup channel of the first network and the corresponding second network for the third data transfer device via the second data transfer devices to the first data transfer device according to the transmission source address of the maintenance management.

4. The network system as claimed in claim 1, wherein the maintenance management data transmitted to each third transfer device includes an identifier which indicates whether the maintenance management data is for the communication path for the currently used channel or the backup channel in the first network and the corresponding second network for the third data transfer device.

5. The network system as claimed in claim 4, wherein the second data transfer devices, when transmitting the maintenance management data to the third data transfer devices, decide a transmission path according to the identifier included in the maintenance management data.

6. The network system as claimed in claim 4, wherein the maintenance management data includes a VLAN tag and the identifier is contained in the VLAN tag.

7. The network system as claimed in claim 4, wherein the maintenance management data includes an MPLS label and the identifier is contained in the MPLS label.

8. The network system as claimed in claim 1, wherein the first data transfer device includes a storage unit which holds maintenance management information on each of the communication paths of the currently used channels and the backup channels in the first and the second networks.

9. The network system as claimed in claim 1, wherein when a failure occurs in the communication path of the currently used channel of one of the second networks, if the failure relates to an upstream communication path, the second data transfer devices transmit failure report data to the first data transfer device, and if the failure relates to a downstream communication path, the third data transfer device corresponding to the one of the second networks transmits failure report data to the first data transfer device via the second data transfer devices, and wherein when the first data transfer device receives the failure report data, the first data transfer device transmits a switching instruction data for the communication path in which the failure occurred.

10. A network system, including:
- a first network and a plurality of second networks for transferring multicast data;
- a first data transfer device connected to the first network;
- a plurality of second data transfer devices connected to the first network and the plurality of second networks; and
- a plurality of third data transfer devices each connected to a corresponding second network of the plurality of second networks; wherein the multicast data is transferred from the first data transfer device via the second data transfer devices to each of the third data transfer devices in response to a request for the multicast data, when a failure occurs in a communication path of a currently used channel of one of the second networks, if the failure relates to an upstream communication path, the second data transfer devices transmit failure reporting data to the first data transfer device, and if the failure relates to a downstream communication path, one of the third data transfer devices that corresponds to the one of the second networks transmits failure reporting data to the first data transfer device via the second data transfer devices, and when the first data transfer device receives the failure reporting data, the first data transfer device transmits a switching instruction data for the communication path concerning the second network system where the failure has occurred.

\* \* \* \* \*